(12) United States Patent
Tanji

(10) Patent No.: US 10,232,584 B2
(45) Date of Patent: Mar. 19, 2019

(54) RESIN SANDWICH PANEL, AND METHOD FOR MANUFACTURING RESIN SANDWICH PANEL

(71) Applicant: Kyoraku Co., Ltd., Kyoto-Shi, Kyoto (JP)

(72) Inventor: Tadatoshi Tanji, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 15/319,302

(22) PCT Filed: May 30, 2015

(86) PCT No.: PCT/JP2015/065699
§ 371 (c)(1),
(2) Date: Dec. 15, 2016

(87) PCT Pub. No.: WO2015/194349
PCT Pub. Date: Dec. 23, 2015

(65) Prior Publication Data
US 2017/0151747 A1 Jun. 1, 2017

(30) Foreign Application Priority Data
Jun. 19, 2014 (JP) .................................. 2014-125999

(51) Int. Cl.
B32B 3/26 (2006.01)
B32B 5/18 (2006.01)
(Continued)

(52) U.S. Cl.
CPC ............ B32B 3/266 (2013.01); B29C 43/206 (2013.01); B29C 43/56 (2013.01); B32B 3/30 (2013.01);
(Continued)

(58) Field of Classification Search
CPC ................................................... B32B 3/266
USPC .......................................................... 428/68
See application file for complete search history.

(56) References Cited

U.S. PATENT DOCUMENTS 5,804,127 A 9/1998 Takatori et al.
6,045,647 A 4/2000 Takikawa et al.
(Continued)

FOREIGN PATENT DOCUMENTS

JP S57015921 A 1/1982
JP 02231125 A * 9/1990
(Continued)

OTHER PUBLICATIONS

International Search Report dated Aug. 25, 2015 issued in corresponding PCT International Application No. PCT/JP2015/065699.
(Continued)

*Primary Examiner* — Brent T O'Hern
(74) *Attorney, Agent, or Firm* — Troutman Sanders LLP

(57) ABSTRACT

In a resin sandwich panel, the two resin skin material sheets have peripheral edge portions thereof joined to each other so as to form an internal hollow portion. The resin core material is disposed in the hollow portion. At least one of surfaces of the resin core material opposing the two resin skin material sheets has a groove portion extending across the entire surface, and a depression communicating with the groove portion. At least one of the two resin skin material sheets additionally has an atmosphere-opened through-hole provided in a thickness direction thereof. When the one of the surfaces of the resin core material and the corresponding resin skin material sheet are surface-to-surface adhered to each other in the hollow portion, air between the surfaces and the skin material sheet is guided to the depression via the groove portion, and exhausted out of the atmosphere-opened through-hole.

15 Claims, 19 Drawing Sheets

(51) Int. Cl.
*B32B 27/00* (2006.01)
*B32B 3/30* (2006.01)
*B29C 43/20* (2006.01)
*B29C 43/56* (2006.01)
*B32B 7/12* (2006.01)
*B32B 27/06* (2006.01)
*B32B 27/08* (2006.01)
*B32B 37/18* (2006.01)
*B32B 38/00* (2006.01)
*B29C 43/18* (2006.01)
*B29K 101/12* (2006.01)
*B29L 31/30* (2006.01)

(52) U.S. Cl.
CPC ............ *B32B 5/18* (2013.01); *B32B 7/12* (2013.01); *B32B 27/00* (2013.01); *B32B 27/065* (2013.01); *B32B 27/08* (2013.01); *B32B 37/182* (2013.01); *B32B 38/0004* (2013.01); *B29C 2043/182* (2013.01); *B29C 2043/563* (2013.01); *B29K 2101/12* (2013.01); *B29L 2031/30* (2013.01); *B32B 2250/03* (2013.01); *B32B 2250/24* (2013.01); *B32B 2266/0214* (2013.01); *B32B 2305/02* (2013.01); *B32B 2605/00* (2013.01)

(56) References Cited

U.S. PATENT DOCUMENTS

| | | | |
|---|---|---|---|
| 2004/0253407 A1* | 12/2004 | Shah | B32B 3/12 428/73 |
| 2009/0029083 A1 | 1/2009 | Endo | |
| 2010/0104788 A1 | 4/2010 | Kitano et al. | |
| 2011/0025384 A1 | 2/2011 | Yun et al. | |
| 2011/0135862 A1* | 6/2011 | Sumi | B29C 43/146 428/36.91 |
| 2011/0250384 A1 | 10/2011 | Sumi et al. | |
| 2012/0237759 A1 | 9/2012 | Ehbing et al. | |
| 2013/0089693 A1 | 4/2013 | Kitano et al. | |

FOREIGN PATENT DOCUMENTS

| | | | |
|---|---|---|---|
| JP | H02-231125 A | | 9/1990 |
| JP | 07246673 A | * | 9/1995 |
| JP | H07246673 A | | 9/1995 |
| JP | H08323847 A | | 12/1996 |
| JP | 2000218682 A | | 8/2000 |
| JP | 2004045867 A | | 2/2004 |
| JP | 2006334801 A | | 12/2006 |
| JP | 2007098607 A | | 4/2007 |
| JP | 2008247003 A | | 10/2008 |
| JP | 2009119728 A | | 6/2009 |
| JP | 2010052389 A | | 3/2010 |
| JP | 2013506575 A | | 2/2013 |
| JP | 2014079901 A | | 5/2014 |
| JP | 2015104887 A | | 6/2015 |

OTHER PUBLICATIONS

Extended European Search Report dated Dec. 6, 2017 during the prosecution of EP Patent Application No. 15809252.8.

* cited by examiner

RESIN SANDWICH PANEL, AND METHOD FOR MANUFACTURING RESIN SANDWICH PANEL

CROSS-REFERENCE TO RELATED APPLICATIONS

This is a U.S. national phase application under 35 U.S.C. § 371 of International Patent Application No. PCT/JP2015/065699, filed May 30, 2015, and claims benefit of priority to Japanese Patent Application No. 2014-125999, filed Jun. 19, 2014. The entire contents of these applications are hereby incorporated by reference.

TECHNICAL FIELD

The present invention relates to a resin sandwich panel. More specifically, the present invention relates to a resin sandwich panel in which molding failure is not caused and of which required stiffness can be ensured, while maintaining visual aesthetics.

BACKGROUND

So-called sandwich panels have been typically used for various purposes, including transport machines such as automobiles and aircraft; building materials; floor boards for beds; electric device housings; and sports and leisure activities. A sandwich panel includes two skin material sheets and a core material interposed between the skin material sheets. A laminated structure of the skin material sheet, the core material, and the skin material sheet is the basic form. In accordance with the purpose, the functions required of the sandwich panel may vary. For example, when visual aesthetics are considered important while not much strength is required, such as in the case of an interior panel for use in the bathroom, a decorative material may be additionally affixed to the front-side skin material sheet presenting the exterior appearance. In this way, importance is given to the surface property of the decorative material or the overall molded shape. When the use is as structural material, strength is demanded more than visual aesthetics. In this respect, interior material components for transport machines such as automobiles and aircraft, particularly the cargo floor board, deck board, rear parcel shelf and the like for vehicles, are required to be lightweight from the viewpoint of increasing fuel economy, as well as being strong. Accordingly, resin sandwich panels including the skin material sheets and core material that are made of resin have often been used.

More specifically, when a sandwich panel made of resin is utilized as an automobile cargo floor lid, the sandwich panel is used for the placement of heavy baggage on the cargo floor lid. Accordingly, the sandwich panel is required to have not just visual aesthetics but also the stiffness (particularly bending stiffness) to withstand the weight of the baggage. On the other hand, being lightweight is also demanded from the viewpoint of increasing fuel economy. Therefore, it is necessary to overcome the technical problem of achieving both high stiffness and lightweight, which is difficult to solve. Accordingly, as skin material sheets of the resin sandwich panels for such uses, hard resin material having a high Young's modulus has been adopted. Meanwhile, with regard to the core material, the bulk (core material thickness) may be increased so as to maximize the interval between the skin material sheets, so that the core material per se can be made lightweight while achieving an increase in section modulus. For this purpose, foamed material is adopted, for example. Alternatively, a core material with an internal hollow portion or a number of recesses in the surface thereof may be adopted.

In such resin sandwich panel, in order to achieve weight reduction by providing the core material with voids, resin may be foamed to produce numerous internal cells, as disclosed in Japanese Unexamined Patent Application Publication Nos. 2006-334801 and 2008-247003. Japanese Unexamined Patent Application Publication Nos. 2006-334801 and 2008-247003 commonly relate to the sandwich structural body for interior material panels of automobiles, such as deck boards and floor panels. According to Japanese Unexamined Patent Application Publication No. 2006-334801, two strips of molten parisons are positioned between split mold blocks. Between the two strips of molten parisons, a pre-molded core material 13 made of resin, such as polypropylene, is disposed. Then, molding is performed by pressing the split mold blocks using vacuum or compressed air. According to Japanese Unexamined Patent Application Publication No. 2008-247003, with the split mold blocks disposed one above the other, a back-side sheet material that has been previously molded and then softened by re-heating is placed on the lower mold block. Then, the back-side sheet material is vacuum-suctioned via the lower mold block, whereby the back-side sheet material is shaped. A foamed resin of polyethylene, for example, is placed on the back-side sheet material, with a front-side sheet material that has been previously molded and then softened by re-heating placed on the foamed resin. Thereafter, the mold blocks are clamped while performing vacuum suction via the upper and lower mold blocks, whereby a sandwich structural body is molded. With the sandwich panel thus molded, weight reduction can be achieved by the formation of cells by foaming.

However, when the surface of the resin core material 13 and the opposing thermoplastic resin sheet are welded, air is present therebetween. Accordingly, one or a plurality of air accumulations of various sizes may be formed at unexpected positions. As a result, the following technical problems may be caused.

First, molding failure or lack of stiffness may be caused in the resin sandwich panel. More specifically, unexpected air accumulations are formed between the surface of the resin core material 13 and an opposing surface of the corresponding thermoplastic resin sheet. Accordingly, the air accumulations have a two-dimensional expanse. However, their thickness is very small, and their volume is also small. When the split mold blocks are clamped so as to sandwich the resin core material 13, the hermetic space inside the mold is pressurized. As a result, if there are air accumulations between the surface of the resin core material 13 and the opposing thermoplastic resin sheet, an internal pressure increase is readily caused by the clamping, resulting in bulging and an increase in the air accumulation region. This may cause peeling between the surface of the resin core material 13 and the opposing thermoplastic resin sheet. As a result, weld peel-off is readily caused, triggering a molding failure. Even when molding failure is not caused, insufficient welding may cause a decrease in stiffness of the resin sandwich panel as a whole. Secondly, the aesthetic exterior appearance of the resin sandwich panel may be lost. More specifically, if the air accumulation region expands as the split mold blocks are clamped as described above, portions of the outer surface of the thermoplastic resin sheet corresponding to the air accumulation region may partially bulge. As a result, the flatness of the outer surface of the thermoplastic resin sheet is lost, whereby the aesthetic exterior appearance of the resin sandwich panel is compromised. It is technically difficult to perform clamping of the split mold blocks while eliminating such air accumulations in advance.

Third, with the sandwich panel molding method, it may be difficult to obtain a high-quality sandwich panel. More specifically, for forming cells by foaming, as in Japanese Unexamined Patent Application Publication Nos. 2006-334801 and 2008-247003, chemical foaming technology or physical foaming technology is generally used. In either case, the foaming by itself does not pose a restriction on the core material molding method. As in the case of non-foamed core material, extrusion molding, injection molding, blow molding, or press molding may be utilized. However, as the foam expansion ratio is increased, it becomes difficult to adjust the foam expansion ratio, particularly in the case of extrusion molding or injection molding. As a result, it becomes difficult to obtain desired quality.

SUMMARY

In view of the above technical problems, an object of the present invention is to provide a resin sandwich panel in which molding failure is not caused and of which required stiffness can be ensured, while maintaining visual aesthetics.

In order to achieve the above object, a resin sandwich panel according to the present invention includes: two resin skin material sheets; and a resin core material sandwiched between the skin material sheets and surface-to-surface adhered to each of the skin material sheets. The two resin skin material sheets have peripheral edge portions thereof joined to each other so as to form an internal hollow portion. The resin core material is disposed in the hollow portion. At least one of surfaces of the resin core material opposing the two resin skin material sheets has a groove portion extending across the entire surface, and a depression communicating with the groove portion. At least one of the two resin skin material sheets additionally has an atmosphere-opened through-hole provided in a thickness direction thereof so that when the at least one of the surfaces of the resin core material and the corresponding resin skin material sheet are surface-to-surface adhered to each other in the hollow portion, air between the at least one of the surfaces and the corresponding resin skin material sheet is guided to the depression via the groove portion, and exhausted out of the atmosphere-opened through-hole.

According to the resin sandwich panel having the above-described configuration, at least one of the surfaces of the resin core material opposing the two resin skin material sheets is provided with a groove portion extending across the entire surface and a depression communicating with the groove portion. Accordingly, when the surface of the resin core material on the groove portion side and the resin skin material sheet opposing thereto are surface-to-surface adhered to each other, even if an unexpected air accumulation is formed therebetween, the air accumulated in the air accumulation can be accumulated in the depression via the groove portion. Moreover, the accumulated air can be exhausted from the atmosphere release hole via the groove portion. The groove portion provides the air-vent function. For example, when the resin sandwich panel is molded, the risk of molding failure due to air accumulation, or, even in the absence of molding failure, the risk of a lack of stiffness of the resin sandwich panel as a whole due to insufficient welding between the resin core material and the resin skin material sheet, is eliminated. In addition, the risk of the aesthetic exterior appearance of the resin sandwich panel being compromised by a partial bulging of an air accumulation region that has expanded is eliminated. Accordingly, the resin sandwich panel in which molding failure is not caused and of which required stiffness can be ensured can be provided while maintaining visual aesthetics. The depression herein refers to an internal space closed by the corresponding resin skin material sheet on at least one of the surfaces of the resin core material. The depression may or may not penetrate through the resin core material in the thickness direction thereof.

The depression, moreover, includes an opening formed in the at least one of the surfaces, the depression extending inwardly and further including an internal void closed by the corresponding resin skin material sheet. The opening has an area set to ensure sufficient surface adhesion between the at least one of the surfaces and the corresponding resin skin material sheet. The void preferably has a volume set to be sufficient that, when the at least one of the surfaces of the resin core material and the corresponding resin skin material sheet are surface-to-surface adhered to each other in the hollow portion, an increase in an internal pressure of the void can be suppressed with the air guided to the depression via the groove portion.

Additionally, the resin core material is in solid form. The depression is preferably constituted by the void formed in a solid portion.

The resin core material, moreover, is constituted by a pair of thermoplastic resin plate members. The depression has an opening formed in a surface of one of the pair of thermoplastic resin plate members, and is constituted by an annular rib protruding, on an inner-surface side, toward the other thermoplastic resin plate member. The pair of thermoplastic resin plate members preferably forms an internal hollow portion.

Additionally, the groove portion may include a single long curved groove.

The groove portion may further include a plurality of nestled annular grooves, at least adjacent grooves of which communicating with each other.

The groove portion, moreover, may be lattice-shaped and be constituted by a first groove portion group extending in parallel to a long side of the resin core material and a second groove portion group extending in parallel to a short side of the resin core material.

The resin core material, moreover, is a foamed resin having a predetermined foam expansion ratio. The resin skin material sheet opposing the at least one of the surfaces of the resin core material may be joined to a bottom surface of the groove portion.

The groove portion moreover, is disposed on each of the surfaces of the resin core material. The depression may be disposed penetrating through the resin core material in a thickness direction thereof.

In addition, at least one of the two resin skin material sheets may be further provided with an atmosphere-opened through-hole communicating with the groove portion, in the thickness direction.

The atmosphere-opened through-hole, moreover, is formed by piercing a piercing needle through at least one of the two resin skin material sheets. The depression is preferably provided on the at least one of the surfaces of the resin core material at a location corresponding to the atmosphere-opened through-hole so as to be sufficient to avoid interference with the piercing needle.

Furthermore, the two resin skin material sheets have peripheral edge portions thereof joined to each other so as to form an outer peripheral space portion around the resin core material. The groove portion is provided so as to be opened at an outer edge of the resin core material, the groove portion thereby communicating with the outer peripheral space portion. The atmosphere-opened through-hole may be formed by piercing a piercing needle through at least one of the two resin skin material sheets at a position corresponding to the outer peripheral space portion.

The atmosphere-opened through-hole, moreover, is formed by piercing a piercing needle through at least one of the two resin skin material sheets. The at least one of the surfaces of the resin core material may have a recess having a space sufficient to avoid interference with the piercing needle, the recess being provided at a location corresponding to the atmosphere-opened through-hole so as to communicate with the depression via the groove portion.

The atmosphere-opened through-hole, moreover, is provided at a position corresponding to a flow passageway of the groove portion. The groove portion may be formed as a permanent groove that is not eliminated when the at least one of the surfaces of the resin core material and the corresponding resin skin material sheet are surface-to-surface adhered to each other.

In addition, the two resin skin material sheets have peripheral edge portions thereof joined to each other so as to form an outer peripheral space portion around the resin core material. The groove portion may be formed in the shape of a lattice opened at an outer edge of the resin core material, the lattice-shaped groove portion thereby communicating with the outer peripheral space portion.

In order to achieve the above object, a sandwich panel according to the present invention includes: two resin skin material sheets; and a resin core material sandwiched between the skin material sheets and surface-to-surface adhered to each of the skin material sheets. The two resin skin material sheets have peripheral edge portions thereof joined to each other so as to form an outer peripheral space portion around the resin core material. At least one of surfaces of the resin core material opposing the two resin skin material sheets has a lattice-shaped groove portion opened at an outer edge of the resin core material, the lattice-shaped groove portion thereby communicating with the outer peripheral space portion.

In the resin sandwich panel having the above-described configuration, the resin core material is surface-to-surface adhered to each of the skin material sheets while being sandwiched between the skin material sheets. As the peripheral edge portions of the two resin skin material sheets are joined to each other, an outer peripheral space portion is formed around the resin core material. At least one of the surfaces of the resin core material opposing the two resin skin material sheets is provided with a lattice-shaped groove portion opened at an outer edge of the resin core material. Thereby, the lattice-shaped groove portion communicates with the outer peripheral space portion. Accordingly, when the surface of the resin core material on the lattice-shaped groove portion side and the resin skin material sheet opposing thereto are surface-to-surface adhered to each other, even if an unexpected air accumulation is formed therebetween, the air accumulated in the air accumulation can be dispersed to the outer peripheral space portion via the lattice-shaped groove portion. The outer peripheral space portion per se constitutes an air accumulation. However, compared with an air accumulation on the resin core material, the weldability problem and the problem of exterior appearance due to bulging are small. On the other hand, the volume is large compared with the air accumulation on the resin core material. Accordingly, the lattice-shaped groove portion provides an air-vent function. For example, when the resin sandwich panel is molded, the risk of molding failure due to air accumulation, or, even in the absence of molding failure, the risk of a lack of stiffness of the resin sandwich panel as a whole due to insufficient welding of the resin core material and the resin skin material sheet is eliminated. In addition, the risk of the aesthetic exterior appearance of the resin sandwich panel being compromised by a partial bulging of an air accumulation region that has expanded is eliminated. Accordingly, the resin sandwich panel in which molding failure is not caused and of which required stiffness can be ensured can be provided while maintaining visual aesthetics.

Moreover, the outer peripheral space portion preferably constitutes a hermetic annular space portion.

In addition, the resin core material is a foamed resin having a predetermined foam expansion ratio. At least one of the two resin skin material sheets may be joined to a bottom surface of the groove portion.

Furthermore, the lattice-shaped groove portion may be disposed on a surface of the resin core material opposing each of the two resin skin material sheets.

Furthermore, the lattice-shaped groove portion is constituted by a first groove portion group extending in parallel to a long side of the resin core material and a second groove portion group extending in parallel to a short side of the resin core material. The groove portions of the first groove portion group and the second groove portion group may be opened at an outer peripheral edge of the resin core material.

Moreover, at least one of the two resin skin material sheets additionally preferably has an atmosphere-opened through-hole extending in a thickness direction thereof and communicating with the lattice-shaped groove portion.

In addition, at least one of surfaces of the resin core material opposing the two resin skin material sheets has a depression communicating with the groove portion. The depression includes an opening formed in the at least one of the surfaces, the depression extending inwardly and further constituting an internal void closed by the corresponding resin skin material sheet. The opening has an area set to ensure sufficient surface adhesion between the at least one of the surfaces and the corresponding resin skin material sheet. The void may have a volume set to be sufficient that, when the at least one of the surfaces of the resin core material and the corresponding resin skin material sheet are surface-to-surface adhered to each other in the hollow portion, an increase in an internal pressure of the void can be suppressed by air guided to the depression via the groove portion so that when the at least one of the surfaces of the resin core material and the corresponding resin skin material sheet are surface-to-surface adhered to each other, air between the at least one of the surfaces and the corresponding resin skin material sheet is guided to the depression via the groove portion.

In order to achieve the above object, a method for manufacturing a sandwich panel according to the present invention, the method including a resin core material sandwiched between two resin skin material sheets, includes: a step of preparing in advance the resin core material having a lattice-shaped groove portion formed in at least one of surfaces thereof, the lattice-shaped groove portion being opened at an outer edge of the resin core material; a step of arranging two strips of molten thermoplastic resin sheets between a pair of split-type molds so as to extend beyond an annular pinch-off part formed at a peripheral edge portion of a cavity of each of the pair of split-type molds; a step of forming a hermetic space between at least one of the molds and the corresponding thermoplastic resin sheet and suctioning the thermoplastic resin sheet by depressurizing the hermetic space so as to cause the thermoplastic resin sheet to follow the cavity for shaping; a step of causing the pair of split mold blocks to move to a clamping position so as to sandwich the resin core material between the two strips of molten thermoplastic resin sheets, and thereby welding inner surfaces of the two strips of thermoplastic resin sheets to each other along the pinch-off parts of the pair of split mold blocks, thus integrating the peripheral edge portions of the two strips of thermoplastic resin sheets and, in addition, forming an outer peripheral space portion around the resin core material, and surface-to-surface adhering the corresponding resin skin material sheet to the resin core material while performing air vent between the resin skin material sheet and the resin core material via the lattice-shaped groove portion.

Moreover, the resin core material may be welded, before the clamping of the pair of split mold blocks, by being pressed onto an inner surface of the thermoplastic resin sheet molded by the suctioning.

In addition, the one and/or the other thermoplastic resin sheet may be preliminarily molded in advance and turned into molten state by re-heating.

Furthermore, the method may include a step of pushing out the one and the other molten thermoplastic resin sheets toward an area between the pair of split mold blocks so as to droop downward.

Moreover, the thermoplastic resin sheets may be formed into sheet shape by crushing a molten tubular parison.

In addition, the thermoplastic resin sheets may be formed into the two sheets by cutting a tubular parison at least at two locations thereof along an extrusion direction during extrusion of the molten tubular parison.

Furthermore, the depressurizing step includes a step of causing an outer frame to be moved toward the corresponding outer surface of the thermoplastic resin sheet, the outer frame being fitted with respect to a peripheral edge of at least one of the split mold blocks so as to be freely movable in a clamp direction. The corresponding outer surface of the thermoplastic resin sheet, an inner peripheral surface of the outer frame, and a cavity of each of the pair of split mold blocks may constitute a hermetic space.

Furthermore, the method may include a step of providing at least one of the two resin skin material sheets with an atmosphere-opened through-hole communicating with the lattice-shaped groove portion and extending in a thickness direction of the sheet.

DETAILED DESCRIPTION

A first embodiment of a resin sandwich panel and a method for manufacturing the sandwich panel according to the present invention will be described with reference to the drawings.

A sandwich panel 10 according to the present invention is a panel which may be preferably used as a structural member having high deflection stiffness or flexural buckling for uses including automobiles; aircraft; vehicles and ships; building materials; various electric device housings; floor boards for beds; and sports and leisure activities. In particular, the sandwich panel 10, as a structural member for automobiles and the like, is a panel that helps to achieve an increase in fuel economy from the viewpoint of weight reduction. Specifically, the sandwich panel 10 is a panel that contributes to weight reduction as an interior panel such as a cargo floor board, a deck board, a rear parcel shelf, a roof panel, or a door trim, and other structural members such as door inner panels, platforms, hardtops, sunroofs, hoods, bumpers, floor spacers, and tibia pads. The shape of the sandwich panel 10 may be appropriately determined in accordance with the purpose of the product.

The present embodiment will be described with reference to the case where the sandwich panel 10 is used for an automobile cargo floor lid from which weight reduction and high stiffness are required.

Figure 1:
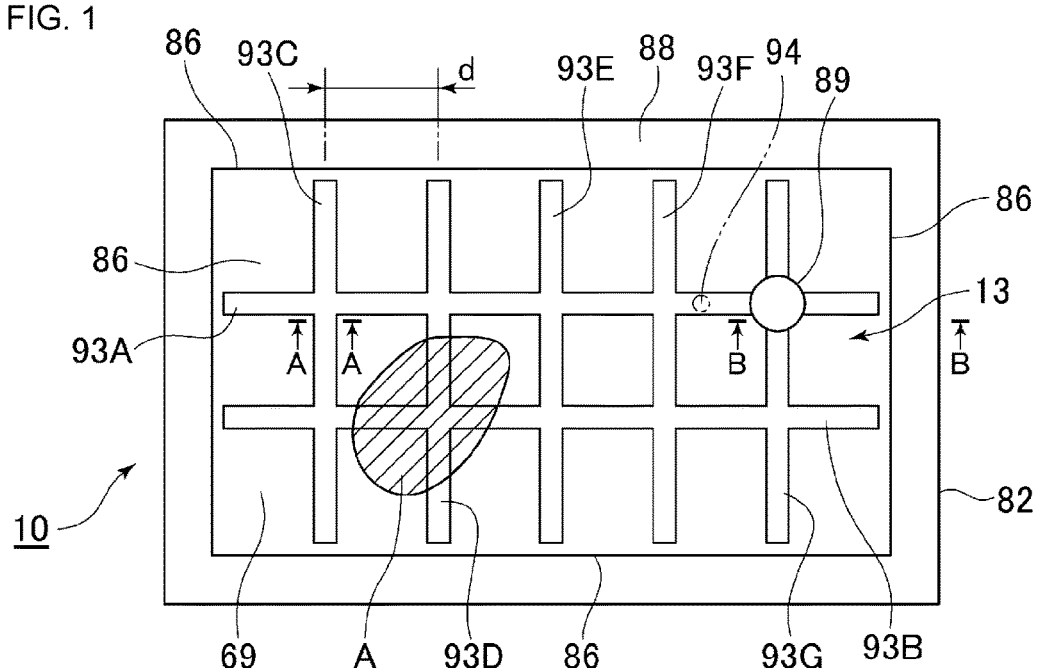
FIG. 1 is a plan view of a resin sandwich panel 10 according to the first embodiment of the present invention.
Figure 2:
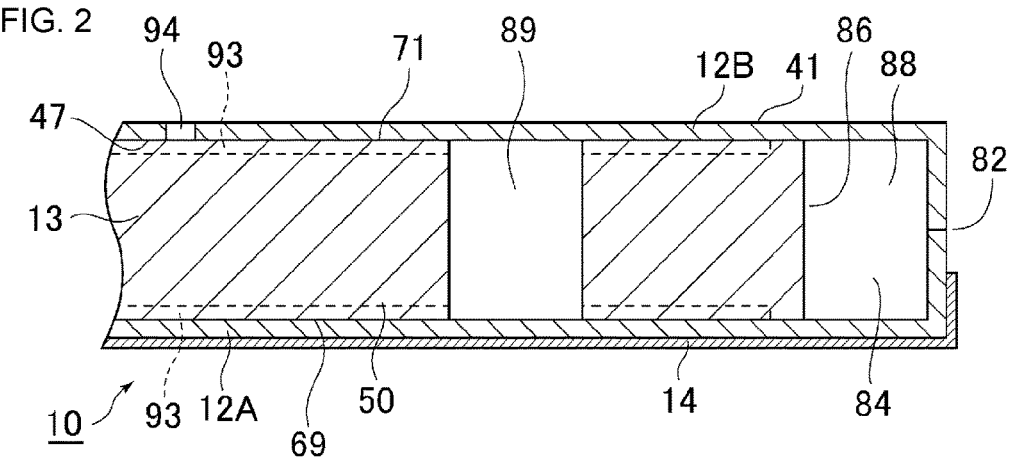
FIG. 2 is a partial cross sectional view along line B-B of FIG. 1.

As illustrated in FIG. 1 and FIG. 2, the sandwich panel 10 includes a front-side skin material sheet 12A, a back-side skin material sheet 12B, a foamable resin core material 13 interposed between the skin material sheets 12A and 12B, and a decorative material sheet 14 affixed to an outer surface of the front-side skin material sheet 12A. The sandwich panel 10 is a laminated structural object including the decorative material sheet 14, the front-side skin material sheet 12A, the resin core material 13, and the back-side skin material sheet 12B.

The front-side skin material sheet 12A and the back-side skin material sheet 12B have peripheral edge portions 82 which are joined, forming an internal hermetic space portion 84. Between the peripheral edge portions 82 and an outer peripheral edge portion 86 of the resin core material 13 in the hermetic space portion 84, an annular space 88 is formed. When molten thermoplastic resin sheets as the materials of the front-side skin material sheet 12A and the back-side skin material sheet 12B are molded, peripheral walls of the sandwich panel 10 are formed by the peripheral edge portions 82. The annular space 88 is provided passively from the viewpoint of preventing molding failure by the peripheral walls becoming attached to the resin core material 13.

The resin core material 13 is formed from a resin with a foaming agent added thereto. Examples of the resin for forming the resin core material 13 include polyolefins (for example, polypropylene and high-density polyethylene), which are homopolymers or copolymers of olefins, such as ethylene, propylene, butane, isoprene pentene, and methylpentene; polyamide; polystyrene; polyvinyl chloride; acrylic derivatives such as polyacrylonitrile and ethylene-ethyl acrylate copolymer; polycarbonate; vinyl acetate copolymer such as ethylene-vinyl acetate copolymer; ionomer; terpolymers such as ethylene-propylene-diene terpolymers; acrylonitrile-styrene copolymer; ABS resin; polyphenylene oxide; polyacetal; phenol resin; polymethacrylimide; and polyetherimide. One kind of the above examples may be used independently, or two or more kinds may be used in a mixture. In particular, by using the same material for the resin core material 13 and the skin material sheet 12, the core material and the sheet can be adhered to each other by thermal welding, without using a solvent or the like. The resin core material 13 may include an additive agent. Examples of the additive agent are inorganic fillers such as silica, mica, talc, calcium carbonate, glass fiber, and carbon fiber; plasticizer; stabilizer; coloring agent; antistatic agent; flame retardant; and foaming agent.

As the foaming agent that may be used for the present invention, any of a physical foaming agent, a chemical foaming agent, and a mixture thereof may be used. Examples of the physical foaming agent that may be used include inorganic system physical foaming agents such as air, carbonic acid gas, nitrogen gas, and water; organic system physical foaming agents such as butane, pentane, hexane, dichloromethane, and dichloroethane; and supercritical fluid thereof. The supercritical fluid may be preferably made using carbon dioxide or nitrogen, for example. In the case of nitrogen, a supercritical fluid can be obtained under the condition of a critical temperature of 149.1° C. and a critical pressure of not less than 3.4 MPa. In the case of carbon dioxide, a supercritical fluid can be obtained under the condition of a critical temperature of 31° C. and a critical pressure of not less than 7.4 MPa. As illustrated in FIG. 2, in the surfaces 69 and 71 of the resin core material 13 respectively opposing the two resin skin material sheets 12, lattice-shaped groove portions 93 are provided. The groove portions 93 provided in the surfaces 69 and 71 of the resin core material 13 have the same structure. Accordingly, the groove portion 93 provided in one of the surfaces 69 will be described. As illustrated in FIG. 1, the lattice-shaped groove portion 93 includes a first groove portion group extending in parallel to the long sides of the resin core material 13, and a second groove portion group extending in parallel to the short sides of the resin core material 13. More specifically, as the groove portion 93, seven groove portions 93A to 93G are provided. The groove portions 93A and 93B are provided in parallel to the long sides of the resin core material 13. On the other hand, the groove portions 93C to 93G are provided in parallel to the short sides of the resin core material 13. Of each of the groove portions 93A to 93G, the ends do not extend to the peripheral edge portion 86 of the resin core material 13. The groove portions 93 do not communicate with the annular space 88. In this case, it is difficult to predict how many air accumulations A of what size will be formed where between the resin skin material sheet 12 and the resin core material 13. Accordingly, it is necessary to increase the density of the lattice-shaped groove portions 93 so that the groove portions 93 can communicate with the unexpectedly formed air accumulation A. In this way, no matter where the air accumulation A may be formed, it becomes possible for the accumulated air to be accumulated in a depression 89 (which will be described later) via the groove portions 93, and then exhausted via the groove portions 93 out of an atmosphere release hole (which will be described later). In FIG. 1, the closed region indicated by hatching of an arbitrary shape indicates the air accumulation A the location of which is indefinite. The interval (lattice width) of the adjacent groove portions 93 may be determined from such viewpoint.

Figure 3:
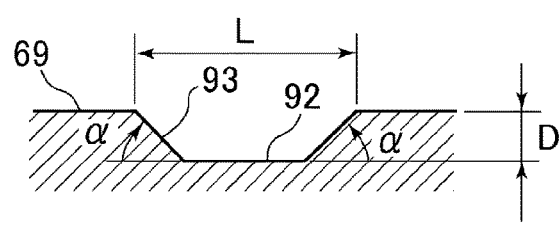
FIG. 3 is a partial cross sectional view along line A-A of FIG. 1.

As illustrated in FIG. 3, the groove portions 93 have a flattened trapezoidal cross sectional shape. The shape makes it possible, as will be described later, for the air accumulated in the air accumulation A when the split mold blocks are clamped during the molding of the sandwich panel to accumulate in the depression 89 (which will be described later) via the groove portions 93, and to be exhausted out of the atmosphere release hole (which will be described later) via the groove portions 93. The width L, depth D, and inclination angle α of the groove portions 93 may be determined from such viewpoint. More specifically, as will be described later, the shape of the groove portions 93 is determined such that the groove portions 93 are formed as permanent grooves that are not eliminated when the split mold blocks are clamped during the molding of the sandwich panel.

The skin material sheets 12 include a sheet formed from polypropylene, engineering plastics, olefin-based resin or the like. By ensuring an interval between the skin material sheets 12 provided on both sides of the resin core material 13, i.e., by ensuring a bulk (thickness) of the resin core material 13, stiffness of the sandwich panel 10 as a whole, in particular bending stiffness, can be ensured. From this viewpoint, for the skin material sheet 12, a material of which stiffness is higher than at least that of the resin core material 13 is required. The skin material sheets 12 constitute an upper wall and a lower wall of the sandwich panel 10. Preferably, the terminal ends of the skin material sheet 12A and the skin material sheet 12B at the outer periphery of the sandwich panel 10 are welded and integrated via a pinch-off part to constitute a sidewall. At the sidewall at the outer periphery of the sandwich panel 10 and at the outer periphery of the resin core material 13, gaps are formed (not illustrated). The gaps prevent deformation of the sandwich panel 10 by a difference in thermal contraction between the skin material sheets 12 and the resin core material 13 that have been molded.

More specifically, for the skin material sheets 12, from the viewpoint of preventing thickness variations due to drawdown or neck-in, a resin material with a high melt tensile force is preferably used. On the other hand, for good transferability and tracking with respect to the mold, a resin material with high flowability is preferably used. Specifically, the skin material sheets 12 are formed from polyolefin (for example, polypropylene or high-density polyethylene) which is a homopolymer or a copolymer of olefins such as ethylene, propylene, butane, isoprene pentene, or methylpentene. The MFR of the polyolefin at 230° C. (as measured according to JIS K-7210 at a test temperature of 230° C. and with a test load of 2.16 kg) is not more than 3.0 g/10 min and preferably 0.3 to 1.5 g/10 min. Alternatively, the skin material sheets 12 are formed from amorphous resin, such as acrylonitrile-butadiene-styrene copolymer, polystyrene, high-impact polystyrene (HIPS resin), or acrylonitrile-styrene copolymer (AS resin). The MFR of the amorphous resin at 200° C. (as measured according to JIS K-7210 at a test temperature of 200° C. and with a test load of 2.16 kg) is 3.0 to 60 g/10 min and preferably 30 to 50 g/10 min. In addition, the melt tension of the amorphous resin at 230° C. (indicating the tensile force measured by means of a melt tension tester manufactured by Toyo Seiki Seisaku-Sho, Ltd. when a strand being extruded out of an orifice with a diameter of 2.095 mm and a length of 8 mm at a remaining heat temperature of 230° C. and at an extrusion rate of 5.7 mm/min is wound up on a roller with a diameter of 50 mm at a winding rate of 100 rpm) is not less than 50 mN and preferably not less than 120 mN.

Further, in order to prevent a shock-induced crack, a hydrogen-added styrene-based thermoplastic elastomer in a range of less than 30 wt % and preferably less than 15 wt % is added to the skin material sheet 12. Specifically, preferable examples of the hydrogen-added styrene-based thermoplastic elastomer are styrene-ethylene-butylene-styrene block copolymer; styrene-ethylene-propylene-styrene block copolymer; hydrogenated styrene-butadiene rubber; and a mixture thereof. The styrene content is less than 30 wt % and preferably less than 20 wt %. The MFR at 230° C. (as measured according to JIS K-7210 at a test temperature of 230° C. and with a test load of 2.16 kg) is 1.0 to 10 g/10 min and preferably not more than 5.0 g/10 min and not less than 1.0 g/10 min.

In addition, the skin material sheet 12 may include an additive agent as in the case of the resin core material 13. Examples of the additive agent are inorganic fillers such as silica, mica, talc, calcium carbonate, glass fiber, and carbon fiber; plasticizer; stabilizer; coloring agent; antistatic agent; flame retardant; and foaming agent. Specifically, silica, mica, glass fiber or the like may be added by not more than 50 wt % and preferably 30 to 40 wt % with respect to the molding resin.

The decorative material sheet 14, when provided on the surface of the skin material sheet 12, is a sheet configured to enhance exterior appearance and for decorative purpose, or to protect an object that comes into contact with the molded article (for example, in the case of the cargo floor board, baggage placed on the upper surface of the board). As the material of the decorative material sheet 14, a fibrous skin-material sheet-like skin material or film-like skin material is used, for example. Examples of the fibrous skin material include synthetic fibers such as polyester, polypropylene, polyamide, polyurethane, acrylic, and vinylon; semisynthetic fibers such as acetate and rayon; recycled fibers such as viscose rayon and cuprammonium rayon; natural fibers such as cotton, linen, wool, and silk; and blend fibers thereof.

Referring to FIG. 1 and FIG. 3, the depression 89 will be described. The depression 89 is provided at an intersection of the groove portions 93. The depression 89 is disposed so as to communicate with two groove portions 93A and 93G. The depression 89 forms a cylindrical through-hole. The through-hole has openings formed in the respective surfaces of the resin core material 13, and extends inwardly so as to penetrate in the thickness direction. The inside of the depression 89 constitutes a void closed by the corresponding resin skin material sheets 12. Accordingly, whether the air accumulation A is formed in one or the other surface of the resin core material 13, the air existing there can be collected in the depression 89 via the groove portions 93.

Figure 4:
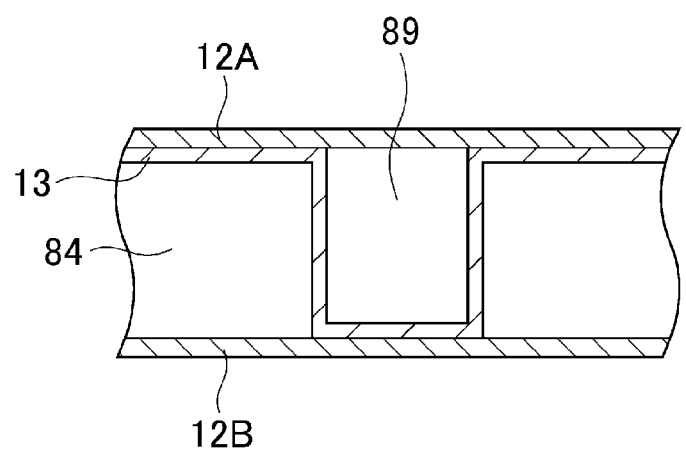
FIG. 4 is a diagram of a modification of the resin sandwich panel 10 according to the first embodiment of the present invention, similar to FIG. 2.

The area of the openings is set so as to ensure sufficient surface adhesion between the respective surfaces of the resin core material 13 and the corresponding resin skin material sheets 12. More specifically, excessive opening area is avoided so as not to lead to a lack of area of adhesion and to a resultant insufficient surface adhesion. Meanwhile, the volume of the void is set to be sufficient that, when the respective surfaces of the resin core material 13 and the corresponding resin skin material sheets 12 are surface-to-surface adhered to each other in the hollow portion, an increase in the internal pressure in the void can be suppressed by the air guided to the depression 89 via the groove portions 93. More specifically, the volume of the void is set to be not too small, so as not to cause an increase in the internal pressure in the void. In this respect, the volume of the void is determined by the size of the openings of the depression 89 and the thickness of the resin core material 13. The thickness of the resin core material 13 may be determined in accordance with the expected volume of the air accumulation A, and with respect to a required volume of the void that has been determined and a maximum allowable area of the openings that has been determined from the viewpoint of ensuring surface adhesion. Alternatively, if the thickness of the resin core material 13 is determined in advance as a specification of the sandwich panel 10, the size of the openings of the depression 89 may be determined in accordance therewith. If the size exceeds the maximum allowable area of the openings, a plurality of depressions 89 may be provided at positions sufficiently spaced apart from each other, from the viewpoint of ensuring surface adhesion. In a modification, if a plurality of depressions 89 is provided while the groove portions 93 are provided in one of the surfaces of the resin core material 13, the depressions 89 may be provided on the surface of the resin core material 13 on which the groove portions 93 are provided, instead of providing depressions 89 so as to penetrate in the thickness direction of the resin core material. In that case, not just when providing the non-through-holes in the solid resin core material 13, the resin core material 13 may be deformed in the thickness direction, and the depressions 89 may be provided on one surface so as to protrude from the other surface (see FIG. 4). As illustrated in FIG. 1 and FIG. 2, in the skin material sheet 12B at a position corresponding to a flow passageway of the groove portions 93, the atmosphere release hole 94 is provided, communicating with the groove portions 93 and penetrating in the sheet thickness direction. The diameter of the atmosphere release hole 94 is smaller than the width of the groove portions 93. The position of the atmosphere release hole 94, particularly its positional relationship with the depression 89, may be determined from the following viewpoint. That is, the air that accumulates in the air accumulation A is accumulated in the depression 89 via the groove portions 93 and exhausted out of the atmosphere release hole 94. In this case, the possible timing for providing the skin material sheet 12B with the atmosphere release hole 94 include the time before and after the surface-to-surface welding of the resin core material 13 and the skin material sheet 12B by the clamping of the split mold blocks, which will be described later. When the atmosphere release hole 94 is formed in the skin material sheet 12B using a piercing needle, for example, before welding, formation of the air accumulation A during welding can be prevented. On the other hand, if the atmosphere release hole 94 is formed by a similar method after welding, the air accumulation A that has been formed during welding may be processed later. In this case, if before welding, the atmosphere release hole 94 may be provided at an arbitrary position as long as communication with the groove portions 93 can be ensured. If after welding, the atmosphere release hole 94 may be provided at a position close to the depression 89.

Figure 17:
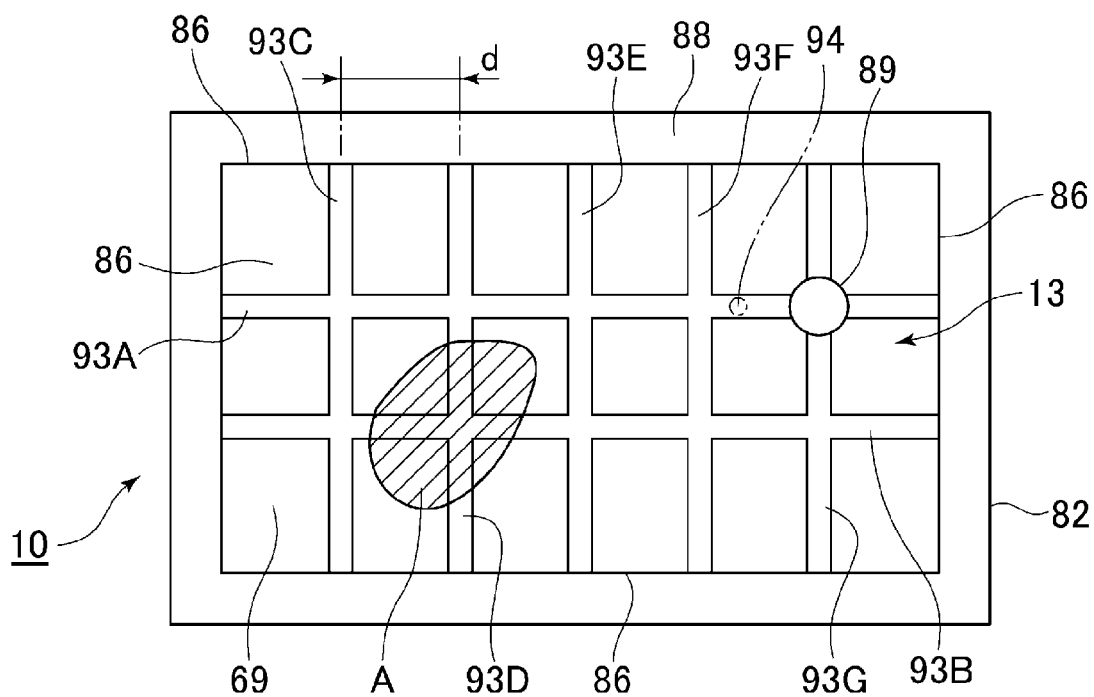
FIG. 17 is a plan view of the resin sandwich panel 10 according to a modification of the first embodiment of the present invention.

In a modification of the first embodiment, as illustrated in FIG. 17, the peripheral edge portions 82 of the skin material sheets 12A and 12B may be welded so as to sandwich the foamed core material 13, using the foamed core material 13 that has already been molded. In this way, when the sandwich panel 10 is molded, by joining the peripheral edge portions 82 of the front-side skin material sheet 12A and the back-side skin material sheet 12B, the hermetic space portion 84 is internally formed. In addition, the annular space 88 is actively formed between the peripheral edge portions 82 and the outer peripheral edge portion 86 of the foamed core material 13 in the hermetic space portion 84. Moreover, on the surfaces 69 and 71 of the resin core material 13 respectively opposing the two resin skin material sheets 12, the lattice-shaped groove portions 93 that are opened at the outer peripheral edge 86 of the resin core material 13 may be provided. Accordingly, the air accumulated in the air accumulation A is accumulated in the depression 89 via the groove portions 93. Moreover, the air is exhausted out of the atmosphere release hole 94 via the groove portions 93. Meanwhile, the groove portions 93 provided on the surface of the foamed core material 13 extend to the outer peripheral edge portion 86 of the foamed core material 13 so as to communicate with the annular space 88. In this way, during mold clamping, the air accumulation A, which may be formed between the foamed core material 13 and the skin material sheets 12A and 12B, can be dispersed to the annular space 88.

Figure 5:
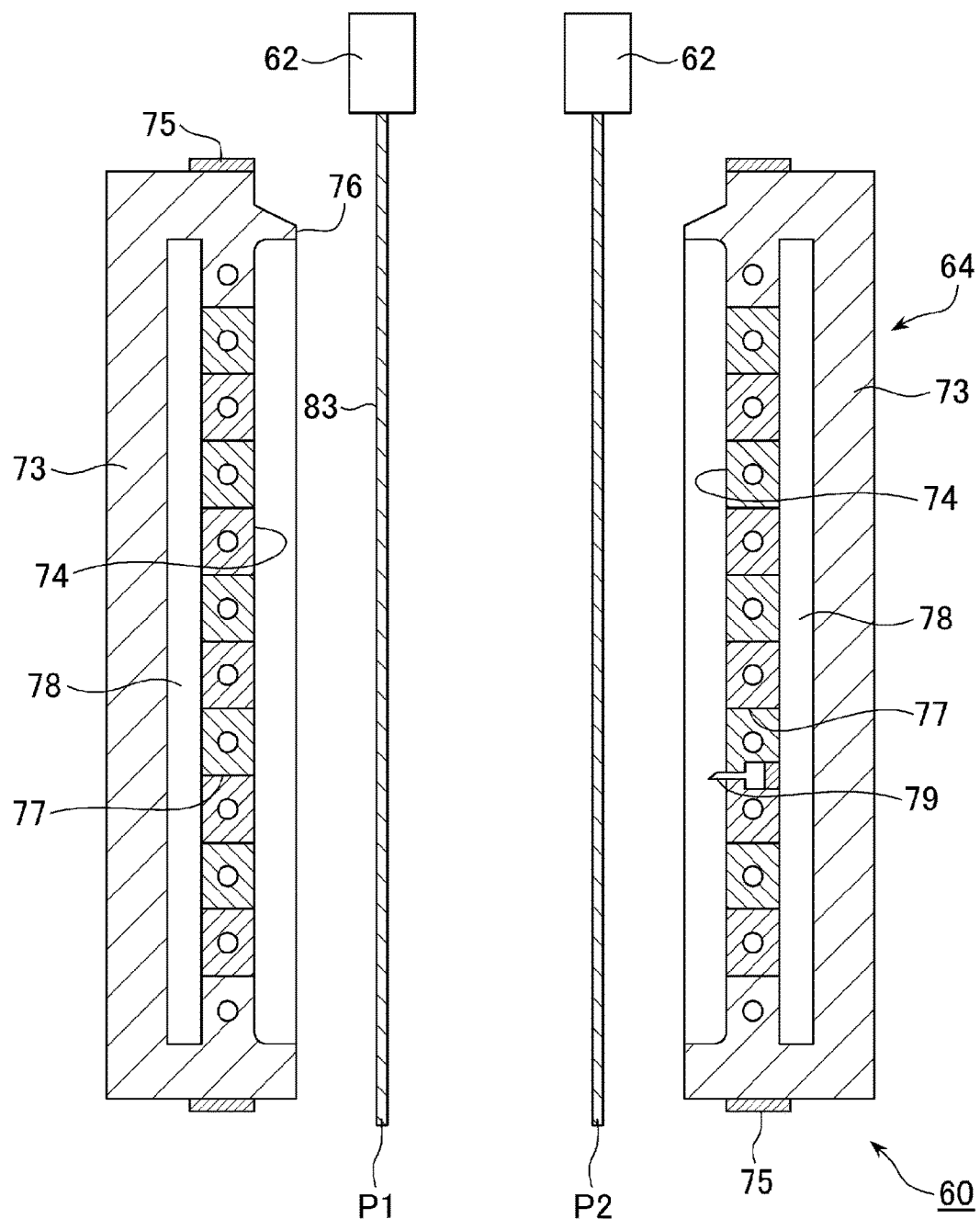
FIG. 5 is a schematic partial cross sectional view illustrating the situation in which, during the molding step for the resin sandwich panel 10 according to an embodiment of the present invention, the resin core material 13 is placed between the thermoplastic resin sheets P1 and P2.

Next, as illustrated in FIG. 5, a molding device 60 for the sandwich panel 10 includes extrusion devices 62, and a clamping device 64 disposed under the extrusion devices 62. Accordingly, molten parisons P extruded from the extrusion devices 62 are sent to the clamping device 64. The molten parisons P are then molded using the clamping device 64. The clamping device 64 as well as the extrusion devices 62 is of typically known types. The clamping device 64 includes two split-type molds 73 and a mold drive device. The mold drive device moves the molds 73 in a direction substantially perpendicular to the direction in which the molten sheet-like parisons P are supplied, between an open position and a closed position. Detailed description of the clamping device 64 is omitted.

The two split-type molds 73 are disposed with their cavities 74 opposing each other. The molds 73 are disposed with their respective cavities 74 facing substantially the vertical direction. In the surfaces of the respective cavities 74, or more accurately, on the inside of an annular pinch-off part 76 which will be described later, irregular portions in accordance with the outer shape and surface shape of the skin material sheets 12 that are to be molded based on the molten sheet-like parisons P are provided.

In each of the two split-type molds 73, the pinch-off part 76 is formed around the cavities 74. The pinch-off part 76 is formed around the cavities 74 in an annular shape while protruding toward the opposing molds 73. Accordingly, when the two split-type molds 73 are clamped, the apex portions of the respective pinch-off parts 76 abut against each other. As a result, a parting line PL is formed at the peripheral edge of the molten parisons P.

Between the two split-type molds 73, a pair of frame members 75 is disposed in a nestled manner with respect to the pair of molds 73 and substantially in parallel with the cavities 74. The pair of frame members 75 each include an opening so that the pair of frame members 75 can be moved in the horizontal direction by a frame member drive device, which is not illustrated. Accordingly, the pair of frame members 75 can be moved in the opposite directions toward the corresponding molten parisons P, with the parisons P being retained, until the apexes of the pinch-off parts 76 of the corresponding molds 73 abut on the surfaces of the parisons P through the openings.

The mold drive device may be a typical device. Each of the two split-type molds 73 is driven by the mold drive device. Accordingly, in the open position, the two molten sheet-like parisons P can be disposed between the two split mold blocks 73, at an interval therebetween. On the other hand, in the closed position, the pinch-off parts 76 of the two split mold blocks 73 abut on each other. In this way, as the annular pinch-off parts 76 abut on each other, a hermetic space is formed within the two split mold blocks 73. In FIG. 5, reference numeral 77 designates a ventilating contact plane; reference numeral 78 designates a vacuum chamber; and reference numeral 79 designates a blow pin.

A method for molding the resin sandwich panel 10 using the above-described molding device will be described. In advance, the resin core material 13 is prepared and the decorative material 14 is disposed in the cavity 74B. With regard to the molding method for the resin core material 13, foamed beads introduced in the mold may be fused and fixed by heating, as according to known art. Alternatively, the molding may be performed by blow molding, vacuum molding, press molding, or, in some cases, injection molding. The resin core material 13 may be of solid type obtained with a tubular parison, or of hollow type obtained with two strips of sheets, as long as the groove portions and the depression 89 communicating with the groove portions are formed in the respective surfaces. The resin core material 13 may be placed at any time between the opening of the molds and the clamping. Thereafter, as illustrated in FIG. 5, the molten thermoplastic resin sheets P1 and P2 are extruded out of the corresponding die slits vertically downward. In this way, two strips of continuous sheet-like thermoplastic resin sheets P1 and P2 are supplied between the two split mold blocks 73 in such a manner as to extend beyond the corresponding pinch-off parts 76.

Then, the frame 75A of the split mold block 73A is moved with respect to the split mold block 73A and toward the thermoplastic resin sheet P1. The frame 75A then abuts on a side surface 83 of the thermoplastic resin sheet P1. In this way, a hermetic space is formed by the side surface 83 of the thermoplastic resin sheet P1, the inner peripheral surface of the frame 75A, and the cavity 73A.

The air in the hermetic space is then suctioned out of the vacuum suction chamber via a suction hole, whereby the thermoplastic resin sheet P1 is suction-attached to the cavity 74A. As a result, the thermoplastic resin sheet P1 is shaped in the shape in conformity to the surface of the cavity 74A.

Then, the resin core material 13 is disposed between the two strips of thermoplastic resin sheets P1 and P2, in parallel to both sheets. The surface of the resin core material 13 is then pressed onto the inner surface of the thermoplastic resin sheet P1, and welded and fixed. In this case, the opposite surface of the resin core material 13 is opened. Accordingly, the air between the resin core material 13 and the inner surface of the thermoplastic resin sheet P1 can be released via the lattice-shaped groove portions 93 and the depression 89. Thereafter, the atmosphere release hole is pierced in the sheet thickness direction using a piercing needle, for example, at a position corresponding to the flow passageway of the groove portions 93 of the thermoplastic resin sheet P1.

Figure 6:
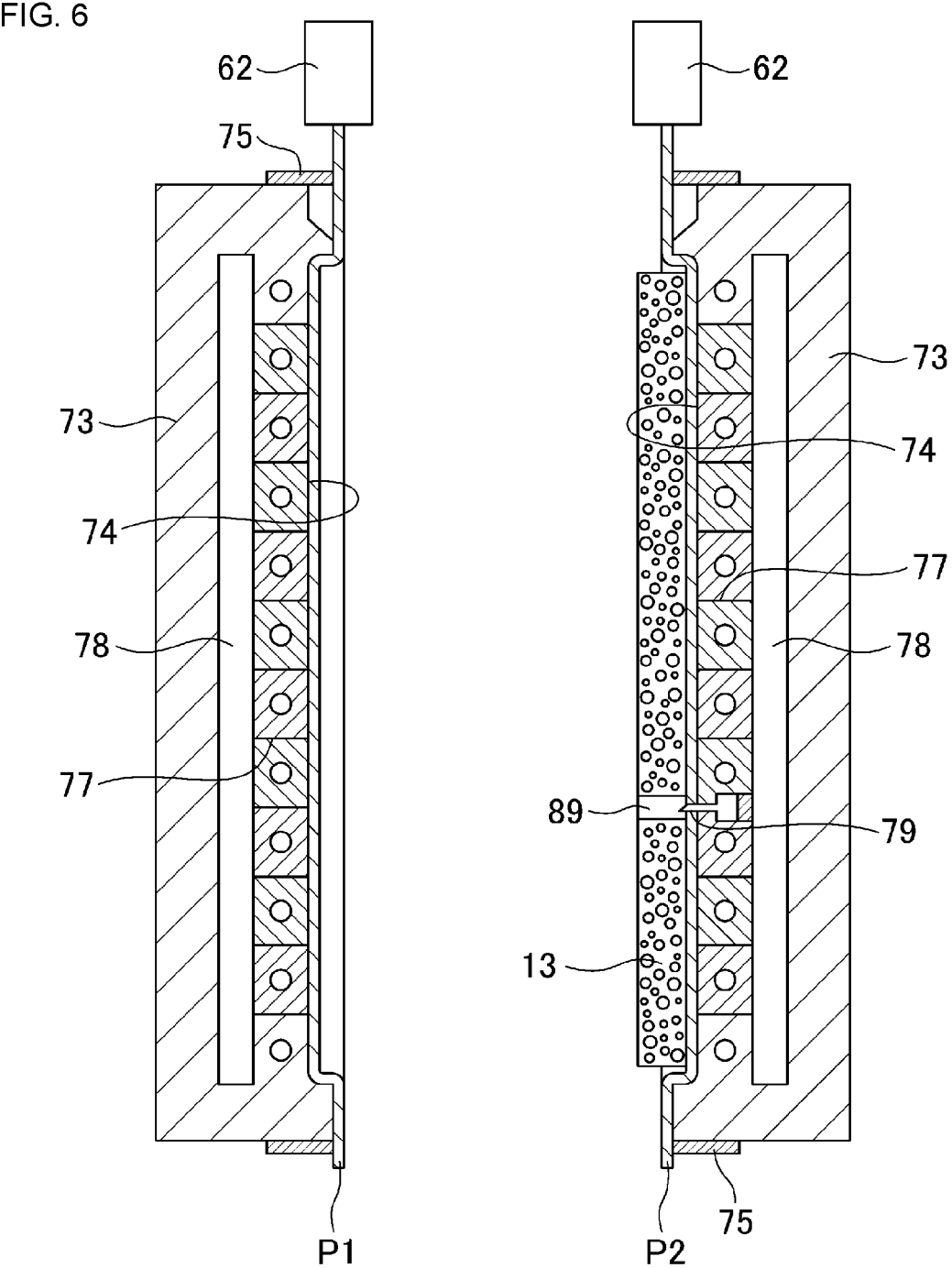
FIG. 6 is a diagram illustrating a state in which, in the molding step for the resin sandwich panel 10 according to an embodiment of the present invention, the split mold block 73 is clamped.

Then, as illustrated in FIG. 6, with the frame 75, abutting on the outer surface 83 of the thermoplastic resin sheet P1, being retained at the unchanged position, and with the thermoplastic resin sheet P1 being retained by suctioning, the molds 73A and B are moved toward each other until the respective annular pinch-off parts 76A and 76B abut on each other, thereby performing clamping. More specifically, the pair of split mold blocks 73 is moved to the clamping position. Then, the inner surfaces of the two strips of thermoplastic resin sheets P1 and P2 are welded along the pinch-off parts 76 of the pair of molds 73. As a result, the peripheral edge portions of the two strips of thermoplastic resin sheets P1 and P2 are integrated, whereby the internal pressure of the molds 73 increases. Accordingly, the air in the air accumulation A formed somewhere between the inner surface of the resin skin material sheet P2 and the surface 69 of the resin core material 13 is accumulated in the depression 89 via the lattice-shaped groove portions 93. Moreover, the air is exhausted out of the atmosphere release hole 94 via the groove portions 93. Meanwhile, the resin core material 13 can be welded and integrated with the inner surfaces of the two strips of thermoplastic resin sheets P1 and P2. In this case, the decorative material 14 is also welded to the thermoplastic resin sheet P2. The air-venting effect at the time of clamping of the split mold blocks 73 is similarly obtained between the surface 71 of the resin core material 13 and the resin skin material sheet P1. It is noted that the extruded thermoplastic resin sheet P may be formed into the sheet form by crushing the molten tubular parison. In addition, during the extrusion of the molten tubular parison, by cutting the tubular parison at least at two locations along the extrusion direction, the tubular parison may be formed into two sheets.

Thereafter, the two split mold blocks 73 are opened, and the completed resin sandwich panel 10 is removed from the cavities 74. Burrs formed around the parting line PL are removed. Thus, the molding of the resin sandwich panel 10 is completed.

As described above, each time the molten thermoplastic resin is intermittently extruded, the above steps are repeated. Accordingly, one resin sandwich panel 10 after another can be efficiently molded. By the extrusion molding, the molten thermoplastic resin sheets P1 and P2 are extruded intermittently. The extruded thermoplastic resin sheets P1 and P2 can be shaped into a predetermined shape, using the molds 73.

In the resin sandwich panel 10 with the above-described configuration, each of the surfaces of the resin core material 13 opposing the two resin skin material sheets 12 is provided with the groove portions 93 extending across the entire surface, and the depression 89 communicating with the groove portions 93. Accordingly, when the surface of the resin core material 13 on the groove portions 93 side and the resin skin material sheet 12 opposing thereto are surface-to-surface adhered to each other, even if an unexpected air accumulation is formed therebetween, the air accumulated in the air accumulation can be accumulated in the depression 89 via the groove portions 93. Moreover, the air can be exhausted out of the atmosphere release hole 94 via the groove portions 93, the groove portions 93 serving an air-vent function. Accordingly, when the resin sandwich panel 10 is molded, for example, the risk of molding failure due to air accumulation can be eliminated. Even in the absence of molding failure, the risk of a lack of stiffness of the resin sandwich panel 10 as a whole due to the development of insufficient weld between the resin core material 13 and the resin skin material sheet can be eliminated. In addition, there is no risk of the aesthetic exterior appearance of the resin sandwich panel 10 being compromised by partial bulging of an air accumulation region that has expanded. Accordingly, the resin sandwich panel 10 can be provided in which molding failure is not caused and of which required stiffness can be ensured, while maintaining visual aesthetics of the panel.

In the following, a second embodiment of the present invention will be described with reference to FIG. 7. In the following description, constituent elements similar to those of the first embodiment are designated with similar reference numerals, and their description is omitted. In the following, the characterizing portions of the present embodiment will be described. The second to the fourth embodiments of the present invention are characterized in that, as in the first embodiment, the skin material sheets 12 are provided with the atmosphere release hole 94 so as to communicate with the groove portions 93. Thereby, the air accumulated in the air accumulation accumulates in the depression 89 via the groove portions 93. In addition, in that way, there is likewise provided the air-vent function via the atmosphere release hole 94. In addition, during the molding of the sandwich panel 10, the atmosphere release hole 94 is formed by piercing a piercing needle through the molten resin sheet constituting the skin material sheet 12 in the thickness direction thereof. However, the second to the fourth embodiments differ from each other in the position at which the atmosphere release hole 94 is provided with respect to the skin material sheet 12. The difference leads to different shapes of the groove portions 93 or different surface shapes of the core material 13.

The characterizing portions of the present embodiment lie in that the atmosphere release hole 94 is provided in the resin skin material sheet 12, and the corresponding form of the groove portions 93. More specifically, first, it is technically difficult to control the position of the piercing needle so that the apex of the piercing needle does not reach the surface of the resin core material 13 while forming, with the piercing needle, the atmosphere release hole 94 penetrating through the skin material sheet 12 in the thickness direction thereof. Accordingly, at the location of the resin core material 13 corresponding to the atmosphere release hole 94, a piercing needle avoidance space is provided. Specifically, as illustrated in FIG. 7, the depression 89 is utilized as the piercing needle avoidance space. In this case, as in the first embodiment, the size of the opening formed by the depression 89 is determined so as to ensure sufficient surface adhesion during the surface-to-surface welding of the resin core material 13 and the corresponding skin material sheet 12. The volume of the void portion formed by the depression 89 is determined from the viewpoint of suppressing an increase in the internal pressure in the void due to the air guided via the groove portions 93. On the other hand, the opening area required of the atmosphere release hole 94 is sufficient if ventilation is obtained between the void portion and the atmosphere. Accordingly, the opening area of the atmosphere release hole 94 is determined so that the depression 89 can be effectively utilized as the piercing needle avoidance space. The thickness of the piercing needle may be determined accordingly. Second, in particular, the depth D and the inclination angle α of the groove portions 93 are set so that, as illustrated in FIG. 8, when the split mold blocks are clamped, the groove portions 93 become crushed and, in addition, flattened. In this way, the back-side skin material sheet 12B is joined to the bottom surface 92 of the groove portions 93. Thereby, a sufficient joint between the back-side skin material sheet 12B and the resin core material 13 can be ensured. In this case, the groove portions 93 are additionally flattened by crushing the groove portions 93 of the resin core material 13. Then, the resin skin material sheet P2 is joined to the bottom surface 92 of the groove portion 90. Thereby, a sufficient joint between the resin skin material sheet P2 and the resin core material 13 can be ensured. Moreover, during the surface-to-surface welding of the resin skin material sheet P2 and the resin core material 13, the air in the air accumulation A is guided to the depression 89 and further to the atmosphere release hole 94 via the groove portions 93. At the same time, the effect of forcing the air toward the depression 89 by the crushing of the groove portions 93 can be also expected. The adoption of the groove portions 93 to be eliminated is common to the second to the fourth embodiments and the sixth embodiment.

Figure 7:
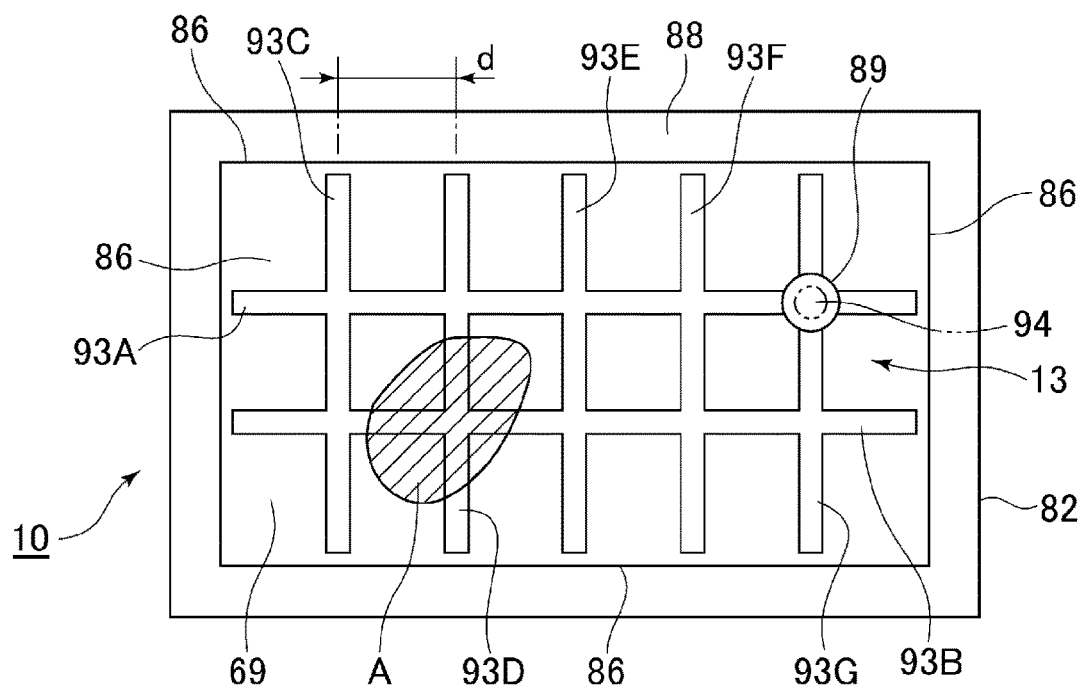
FIG. 7 is a plan view of the resin sandwich panel 10 according to the second embodiment of the present invention.
Figure 8:
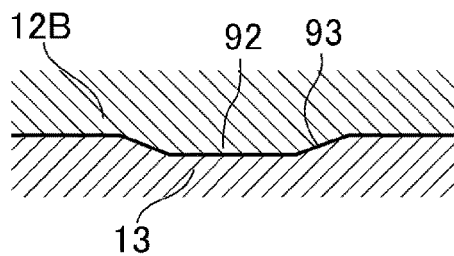
FIG. 8 is a diagram of a groove portion of the resin sandwich panel 10 according to the second embodiment of the present invention, similar to FIG. 3.

By the above-described configuration, if the air accumulation A is formed at the position illustrated in FIG. 7, for example, the air accumulation A will be in communication with any of the lattice-shaped groove portions 93. Accordingly, during the molding of the sandwich panel 10, the air can be vented from the air accumulation A via the groove portions 93 and through the atmosphere release hole 94. More specifically, during the clamping of the split mold blocks, the pressure in the hermetic space in the mold increases, so that the air accumulated in the air accumulation A can be released to the outer air out of the atmosphere release hole 94. In this case, it is difficult to predict how many air accumulations A of what size are formed where between the resin skin material sheet 12 and the resin core material 13. Accordingly, it is necessary to have the density of the lattice-shaped groove portions 93 on the surface 69 increased. In this way, the groove portions 93 can communicate with the unexpectedly formed air accumulation A, and the accumulated air can be released via the atmosphere release hole 94, no matter where the air accumulation A may be formed. In this respect, the present embodiment is similar to the first embodiment. The molding method for the sandwich panel 10 in the present embodiment is the same as that of the first embodiment.

Figure 9:
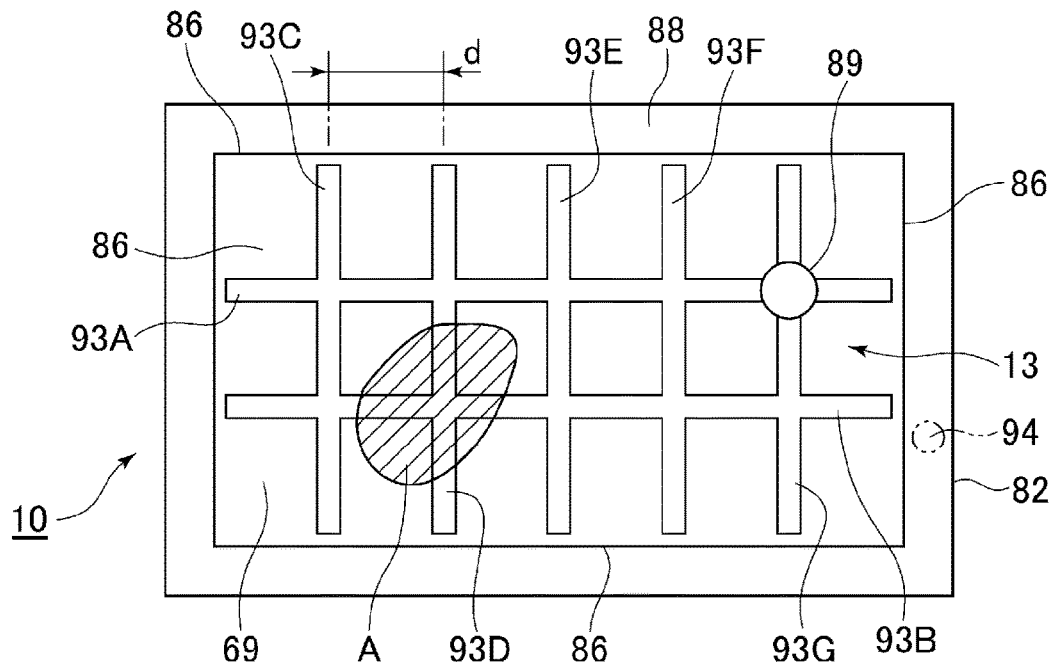
FIG. 9 is a plan view of the resin sandwich panel 10 according to the third embodiment of the present invention.

In the following, a third embodiment of the present invention will be described with reference to FIG. 9. In the following description, constituent elements similar to those of the first embodiment are designated with similar reference numerals, and their description is omitted. In the following, the characterizing portions of the present embodiment will be described in detail. The characterizing portions of the present embodiment differ from the second embodiment in the following respects. Instead of the atmosphere release hole 94 being provided at the portion of the skin material sheet 12 corresponding to the surface of the core material 13, the atmosphere release hole 94 is provided at the location of the annular space 88 formed between the core material 13 and the skin material sheet 12. Accordingly, the groove portions 93 are disposed so as to be opened at the outer peripheral edge portion 86 of the core material 13, and communicate with the annular space 88. In the resin sandwich panel 10 having this configuration, the resin core material 13 is surface-to-surface adhered to each of the skin material sheets 12 while being sandwiched between the skin material sheets 12. For the resin core material 13, the annular space 88 per se serves as the air accumulation A. Compared with the air accumulation A formed on the resin core material 13, there is no problem of weldability between the resin core material 13 and the skin material sheets 12. The problem of exterior appearance due to bulging is also small. On the other hand, the volume is large compared with the air accumulation A on the resin core material 13. Accordingly, by actively utilizing the annular space 88 that has to be passively formed from the viewpoint of molding, the air accumulated over the resin core material 13 can be exhausted.

More specifically, the peripheral edge portions of the two resin skin material sheets 12 are joined. Accordingly, the annular space 88 is formed around the resin core material 13. At least one of the surfaces of the resin core material 13 opposing the two resin skin material sheets 12 is provided with the lattice-shaped groove portions 93 opened at the outer edge of the resin core material 13. Thereby, the lattice-shaped groove portions 93 communicate with the annular space 88. Accordingly, when the surface of the resin core material 13 on the lattice-shaped groove portions 93 side and the resin skin material sheet 12 opposing thereto are surface-to-surface adhered to each other, even if an unexpected air accumulation is formed therebetween, the air accumulated in the air accumulation can be dispersed to the depression 89 and the annular space 88 via the lattice-shaped groove portions 93. The annular space 88 per se serves as the air accumulation A. Compared with the air accumulation A on the resin core material 13, the weldability problem and the problem of exterior appearance due to bulging are small. On the other hand, the volume is large compared with the air accumulation A on the resin core material 13. Accordingly, the lattice-shaped groove portions 93 provides an air-vent function. For example, when the resin sandwich panel 10 is molded, the risk of molding failure due to the air accumulation A is eliminated. Or, even in the absence of molding failure, there is no risk of a lack of stiffness of the resin sandwich panel 10 as a whole due to the development of insufficient welding between the resin core material 13 and the resin skin material sheet 12. There is also no risk of the aesthetic exterior appearance of the resin sandwich panel 10 being damaged by partially bulging of the region of the air accumulation A that has expanded. Accordingly, the resin sandwich panel 10 can be provided in which molding failure is not caused and of which required stiffness can be ensured, while visual aesthetics of the panel is maintained.

In the following, a fourth embodiment of the present invention will be described with reference to FIG. 10 to FIG. 11. In the following description, constituent elements similar to those of the first embodiment will be designated with similar reference numerals, and their description is omitted. In the following, the characterizing portions of the present embodiment will be described. The present embodiment is characterized by the atmosphere release hole 94 provided at the portion of the skin material sheet 12 corresponding to the surface of the core material 13. In this respect, the present embodiment is similar to the second embodiment. However, in the second embodiment, the atmosphere release hole 94 is provided in accordance with the position of the depression 89 provided on the surface of the core material 13, so that the depression 89 per se can be utilized as the piercing needle avoidance space. In the present embodiment, however, the atmosphere release hole 94 is provided at a position different from the position of the depression 89 provided the surface of the core material 13. Thereby, the present embodiment is characterized in that the piercing needle avoidance space is provided in the surface of the core material 13 separately from the depression 89.

Figure 10:
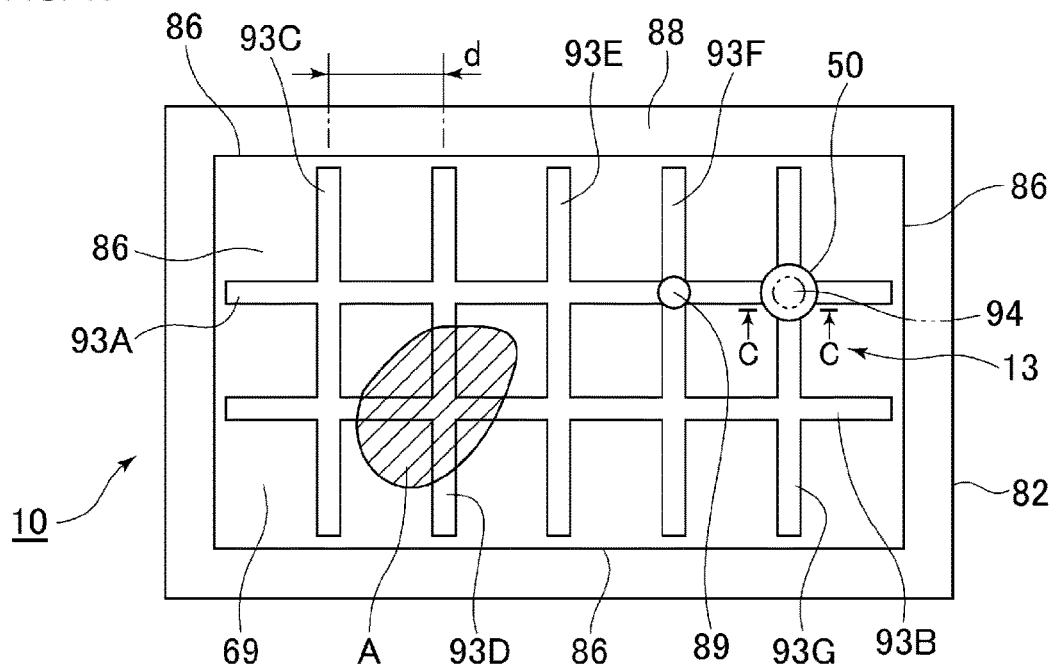
FIG. 10 is a plan view of the resin sandwich panel 10 according to the fourth embodiment of the present invention.

More specifically, as illustrated in FIG. 10, the atmosphere release hole 94 is provided at a location of the skin material sheet 12 corresponding to an intersection of the groove portions 93. Accordingly, the piercing needle avoidance space 50 is provided at the intersection of the groove portions 93. Specifically, at the position of the resin core material 13 corresponding to the atmosphere release hole 94 of the skin material sheet 12, the avoidance space 50 is provided throughout along the thickness direction of the resin core material 13. The space has a size such that the piercing needle does not come into contact therewith.

Figure 11:
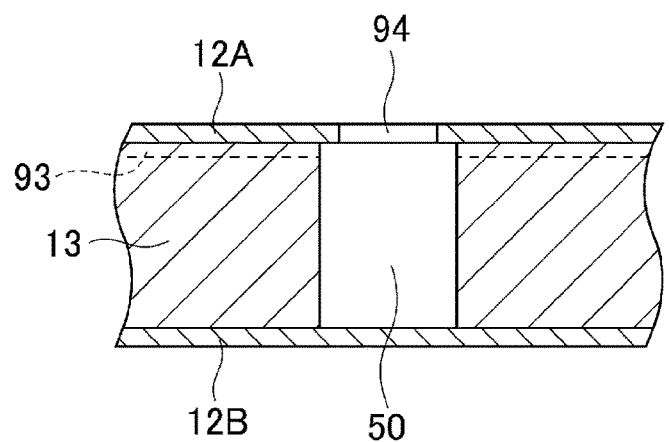
FIG. 11 is a partial cross sectional view along line C-C of FIG. 10.

More specifically, as illustrated in FIG. 11, the avoidance space 50 has a cylindrical shape. The axis of the cylinder is perpendicular to the back-side skin material sheet 12B. The shape of the avoidance space 50 may be determined in accordance with the shape of the piercing needle. If the apex of the piercing needle reaches the surface of the resin core material 13, a hole may be formed in the surface of the resin core material 13. As a result, the resin core material 13 may be readily damaged. The shape of the piercing needle may be determined from the viewpoint of preventing this. In a modification where the groove portions 93 are only provided on one of the surfaces of the resin core material 13, the atmosphere release hole 94 may be provided in the skin material sheet 12 corresponding to the one surface. Accordingly, the avoidance space 50 need not penetrate through in the thickness direction of the resin core material 13. The avoidance space 50 may be provided as a recess opening on one surface.

Figure 12:
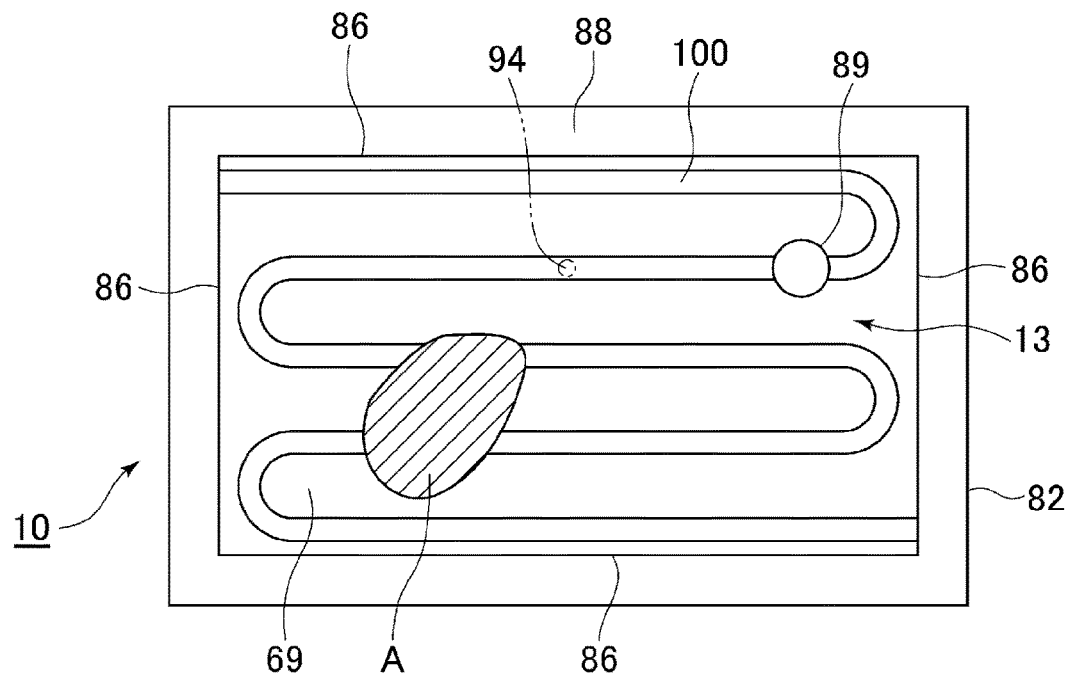
FIG. 12 is a plan view of the resin sandwich panel 10 according to the fifth embodiment of the present invention.

In the following, a fifth embodiment of the present invention will be described with reference to FIG. 12. In the following description, constituent elements similar to those of the first embodiment will be designated with similar reference numerals, and their description is omitted. In the following, the characterizing portions of the present embodiment will be described in detail.

Figure 13:
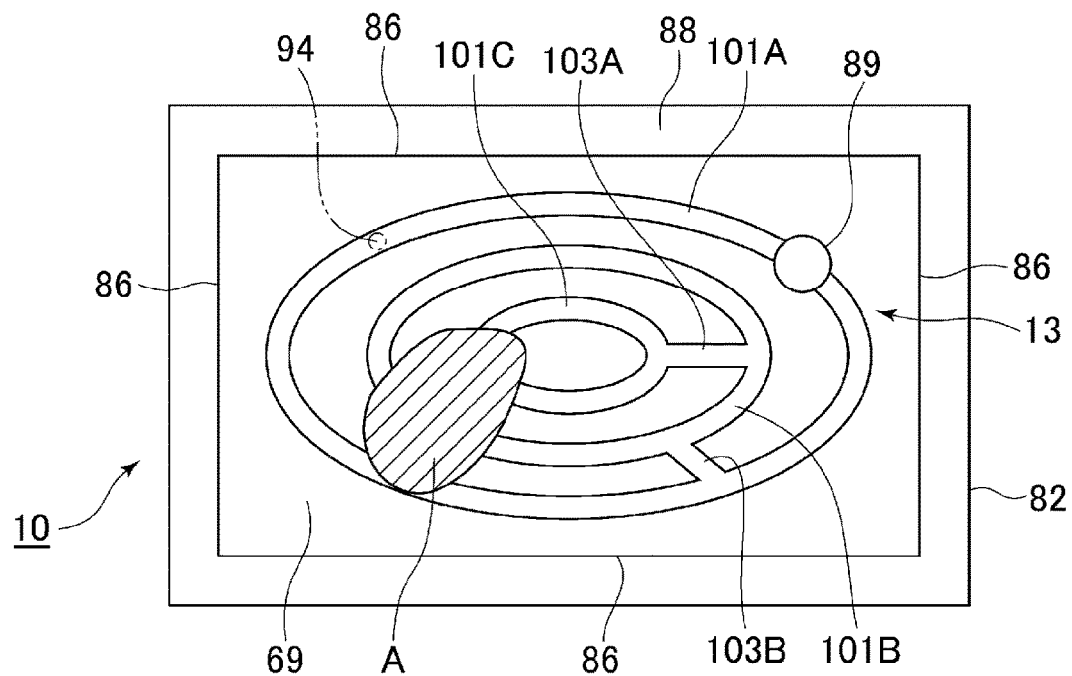
FIG. 13 is a plan view of the resin sandwich panel 10 according to a modification of the fifth embodiment of the present invention.

The present embodiment is characterized by the shape of the groove portions 93. The present embodiment is similar to the first embodiment in that the groove portions 93 are permanent grooves. However, in the first embodiment, the groove portions 93 are lattice-shaped. In the present embodiment, a single curved long groove 100 is provided in a meandering manner across the entire surface of the resin core material 13. The present embodiment is characterized in this respect. In this case, in the first embodiment, the depression 89 is provided at the intersection of the groove portions 93. In the present embodiment, however, there is no intersection of the groove portions 93. Accordingly, the depression 89 is provided so as to communicate with the curved long groove 100 somewhere along the curved long groove 100. As long as the groove portions 93 are provided across the entire surface of the resin core material 13, the groove portions 93 may have various shapes. In a modification, as illustrated in FIG. 13, a plurality of annular grooves 101 in the form of permanent grooves may be provided in a nestled manner. The adjacent annular grooves 101 communicate with each other via a communication passageway 103. In this case, the depression 89 may be provided somewhere along any of the nestled annular grooves 101.

In the following, a sixth embodiment of the present invention will be described with reference to FIG. 14 and FIG. 15. In the following description, constituent elements similar to those of the first embodiment will be designated with similar reference numerals, and their description is omitted. In the following, the characterizing portions of the present embodiment will be described.

In the present embodiment, in order to release air from the unexpected air accumulation A formed between the surface of the resin core material 13 and the skin material sheets 12A and 12B at the time of molding, the surface of the core material 13 is provided with the depression 89. Moreover, groove portions 93 communicating with the depression 89 are provided. In this respect, the present embodiment is similar to the first embodiment. However, the present embodiment is characterized by the form of the depression 89 and the groove portions 93. As illustrated in FIG. 14 and FIG. 15, the depression 89 is a cylindrical through-hole penetrating through the resin core material 13 in the thickness direction thereof. During the molding, a piercing needle 202 is pierced from the outer surface of the resin sheet corresponding to the skin material sheet 12A at a location corresponding to the depression 89 toward the resin core material 13. In this way, the air accumulated in the depression 89 is released via the piercing needle 202. For this purpose, the diameter is set to be at least greater than the outer diameter of the piercing needle 202. In this way, the apex of the piercing needle 202 can penetrate through the skin material sheet 12A in the thickness direction thereof, and stay at a point along the thickness direction of the depression 89. In addition, no contact with the piercing needle 202 takes place. The piercing needle 202 has a hollow portion 203 extending to the apex thereof. When the molds 73 are clamped during molding, the resin core material 13 and the opposing resin sheets are surface-to-surface welded. At the same time, the pressure in the molds 73 increases. In this case, by piercing the piercing needle 202 immediately after the mold clamping, the air accumulated in the depression 89 is exhausted via the piercing needle 202. Alternatively, it is also possible to exhaust the air via the atmosphere release hole formed in the skin material sheet 12A communicating with the depression 89, by removing the piercing needle 202 that has been pierced.

The groove portions 93 communicate with the annular space 88 formed between the peripheral edge portions 82 of the pair of skin material sheets 12 and the peripheral edge portion 86 of the resin core material 13. In this respect, the present embodiment is similar to the first embodiment. However, the groove portions 93 are formed as permanent grooves. More specifically, the groove portions 93 are lattice-shaped so as to extend across the entire surface on each side of the resin core material 13. The depression 89 is provided at a lattice point. The depth and width of the groove portions 93, and the pitch between the adjacent groove portions 93 are determined in accordance with the use of the sandwich panel product 10. In particular, when a product overview is required, preferably the width may be narrowed and the depth may be made shallow. For example, preferably the width may be not more than 4 mm, and the depth may be not more than 1 mm. In this way, as opposed to the first embodiment, the effect of the air being forced into the depression 89 via the groove portions 93 as the groove portions 93 are eliminated during the clamping of the molds 73 cannot be obtained. On the other hand, the groove portions 93 per se, as permanent grooves, function as an active air accumulator similarly to the depression 89.

Figure 14:
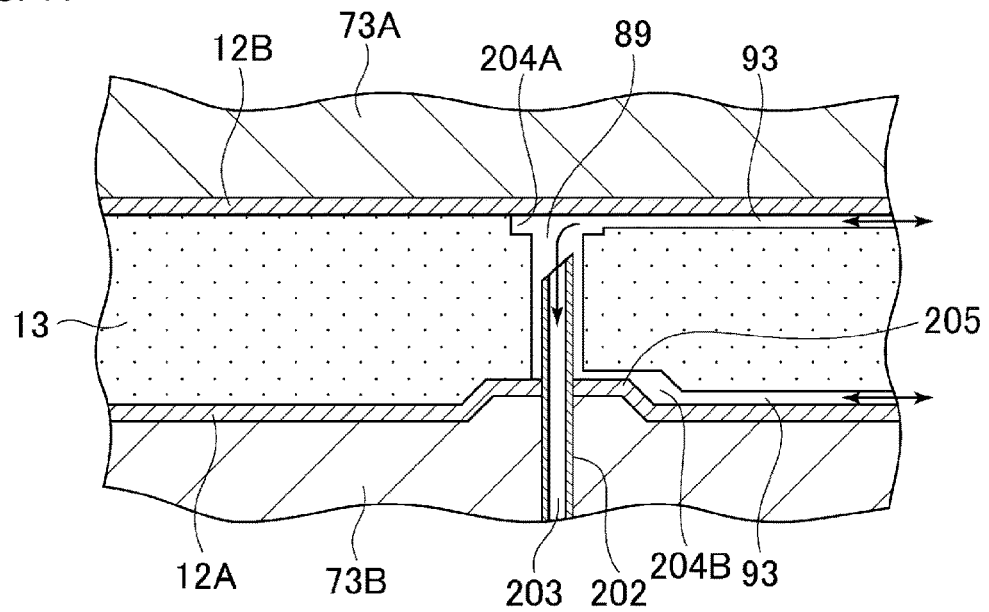
FIG. 14 is a plan view of the resin sandwich panel 10 according to a modification of the sixth embodiment of the present invention.
Figure 15:
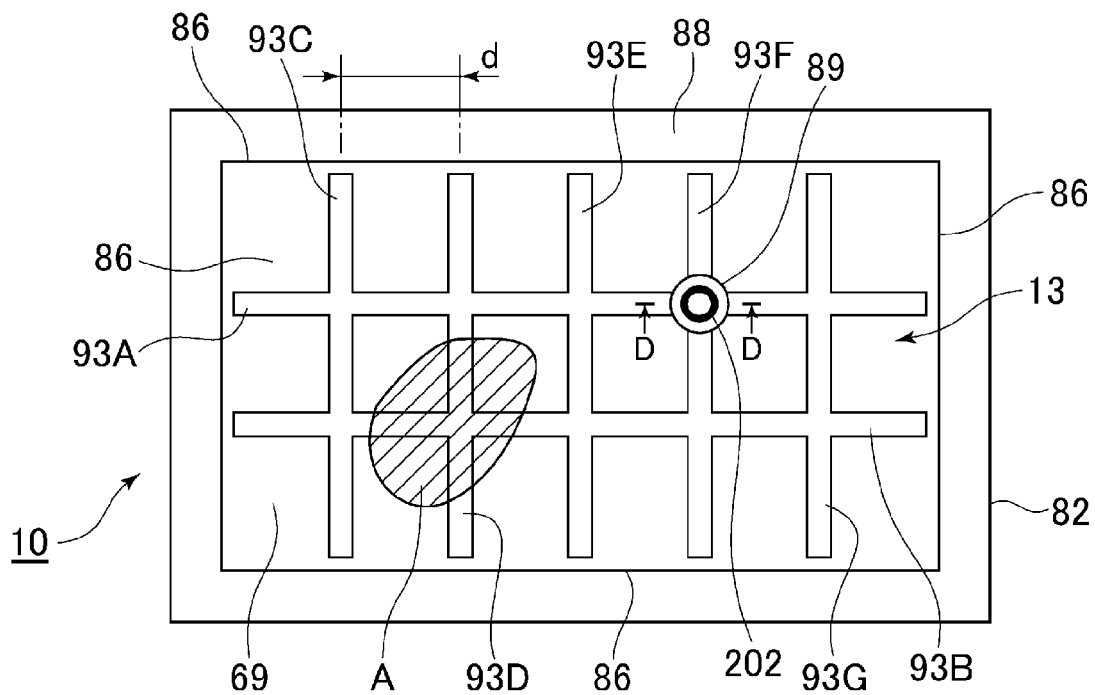
FIG. 15 is a plan view of the resin sandwich panel 10 according to the sixth embodiment of the present invention.

As illustrated in FIG. 14, by further increasing the diameter of the ends of the depression 89 (204A and 204B), the risk of the apex of the piercing needle 202 as it is pierced coming into contact with the depression 89 and thereby scratching the resin core material 13 is decreased. At the same time, the volume of the depression 89 is increased, whereby its function as an active temporary air accumulator can be fully exploited. In addition, in FIG. 14, as illustrated at the lower end of the depression 89, an inwardly bulging portion 205 is provided in the corresponding resin sheet so as to be accommodated within an increased diameter portion 204B at the lower end of the depression 89. In this way, the bulging portion 205 serves as a mark when the outer surface of the resin sheet is pierced by the piercing needle 202 toward the resin core material 13. By the above-described configuration, during the molding, the air in the unexpected air accumulation A can be released to the depression 89 via the permanent grooves and the annular space 88 or directly to the depression 89 via the permanent grooves, and then exhausted via the piercing needle 202 pierced from the outer surface of the resin sheet corresponding to the skin material sheet 12A at the location corresponding to the depression 89.

Figure 16:
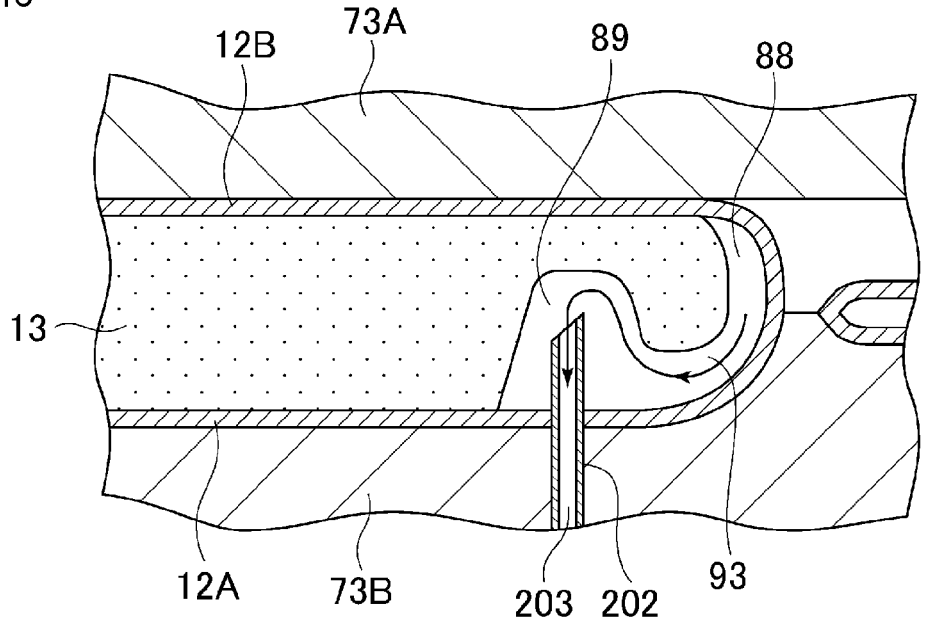
FIG. 16 is a plan view of the resin sandwich panel 10 according to a modification of the seventh embodiment of the present invention.

In the following, a seventh embodiment of the present invention will be described with reference to FIG. 16. In the following description, constituent elements similar to those of the first embodiment are designated with similar reference numerals, and their description is omitted. In the following, the characterizing portions of the present embodiment will be described.

In the present embodiment, in order to release air from the unexpected air accumulation A formed between the surface of the resin core material 13 and the skin material sheet 12 at the time of molding, the surface of the resin core material 13 is provided with the depression 89. Moreover, groove portions 93 communicating with the depression 89 are provided. In this respect, the present embodiment is similar to the first embodiment. However, the present embodiment is characterized by the form of the depression 89 and the groove portions 93. As illustrated in FIG. 14 and FIG. 15, the depression 89 is a substantially truncated conical shaped non-through-hole extending in the thickness direction of the resin core material 13. The depression 89 is provided near the peripheral edge portion 86 of the resin core material 13. During the molding, a piercing needle 202 is pierced from the outer surface of the resin sheet corresponding to the skin material sheet 12A at a location corresponding to the depression 89 toward the resin core material 13. In this way, the air accumulated in the depression 89 is released via the piercing needle 202. For this purpose, the diameter is set to be at least greater than the outer diameter of the piercing needle 202. In this way, the apex of the piercing needle 202 can penetrate through the skin material sheet 12A in the thickness direction thereof, and stay at a point along the thickness direction of the depression 89. In addition, no contact with the piercing needle 202 takes place. The piercing needle 202 has a hollow portion 203 extending to the apex thereof. When the molds 73 are clamped during molding, the resin core material 13 and the opposing resin sheets are surface-to-surface welded. At the same time, the pressure in the molds 73 increases. In this case, by piercing the piercing needle 202 immediately after the mold clamping, the air accumulated in the depression 89 is exhausted via the piercing needle 202. Alternatively, it is also possible to exhaust the air via the atmosphere release hole formed in the skin material sheet 12A communicating with the depression 89, by removing the piercing needle 202 that has been pierced.

The groove portions 93 communicate with the annular space 88 formed between the peripheral edge portions 82 of the pair of skin material sheets 12 and the peripheral edge portion 86 of the resin core material 13. In this respect, the present embodiment is similar to the first embodiment. However, the groove portions 93 are formed as permanent grooves. More specifically, the groove portions 93 are provided, on one surface of the resin core material 13, as a single groove providing communication between the depression 89 provided near the peripheral edge portion 86 of the resin core material 13 and the annular space 88. The depth and width of the groove portions 93 are determined in accordance with the use of the sandwich panel product 10. In particular, when a product overview is required, preferably, the width may be made narrow and the depth may be made shallow. Preferably, for example, the width may be not more than 4 mm, and the depth may be not more than 1 mm.

By the above-described configuration, by utilizing the annular space 88 as an active air accumulator during the molding, the air accumulated in the annular space 88 can be released to the depression 89 via the permanent grooves, and then exhausted via the piercing needle 202 pierced from the outer surface of the resin sheet corresponding to the skin material sheet 12A at the location corresponding to the depression 89.

In the following, the eighth embodiment of the resin sandwich panel according to the present invention and a method for manufacturing the sandwich panel will be described with reference to the drawings.

A sandwich panel 10 according to the present invention is a panel which may be preferably used as a structural member having high deflection stiffness or flexural buckling for uses including automobiles; aircraft; vehicles and ships; building materials; various electric device housings; floor boards for beds; and sports and leisure activities. In particular, the sandwich panel 10, as a structural member for automobiles and the like, is a panel that helps to achieve an increase in fuel economy from the viewpoint of weight reduction. Specifically, the sandwich panel 10 is a panel that contributes to weight reduction as an interior panel such as a cargo floor board, a deck board, a rear parcel shelf, a roof panel, or a door trim, and other structural members such as door inner panels, platforms, hardtops, sunroofs, hoods, bumpers, floor spacers, and tibia pads. The shape of the sandwich panel 10 may be appropriately determined in accordance with the purpose of the product.

The present embodiment will be described with reference to a case where the sandwich panel 10 is used for an automobile cargo floor lid from which weight reduction and high stiffness are required.

Figure 18:
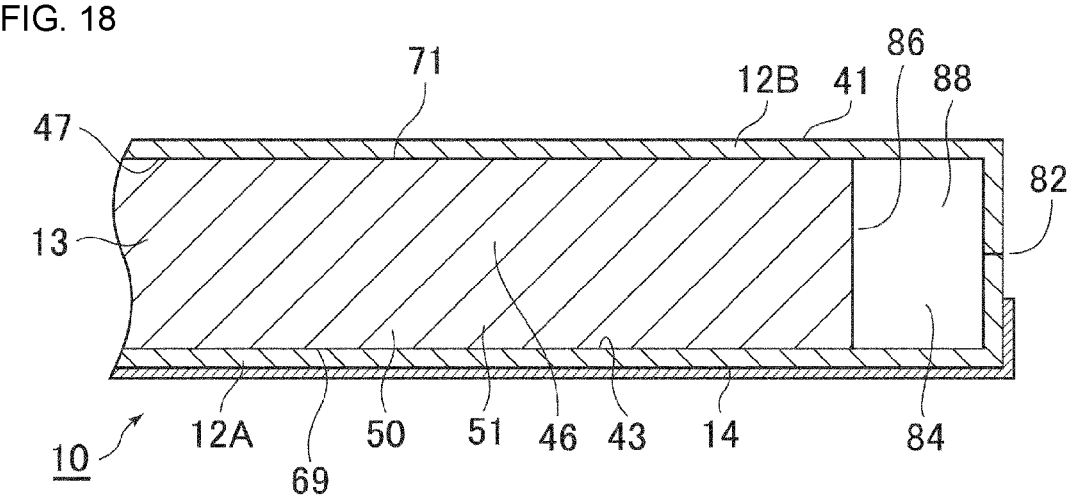
FIG. 18 is a partial cross sectional view of the resin sandwich panel 10 according to the eighth embodiment of the present invention.

As illustrated in FIG. 18, the sandwich panel 10 includes the front-side skin material sheet 12A, the back-side skin material sheet 12B, the foamable foamed core material 13 interposed between the skin material sheets 12A and 12B, and the decorative material sheet 14 affixed to the outer surface of the front-side skin material sheet 12A. The sandwich panel 10 is a laminated structural object including the decorative material sheet 14, the front-side skin material sheet 12A, the foamed core material 13, and the back-side skin material sheet 12B.

Figure 19:
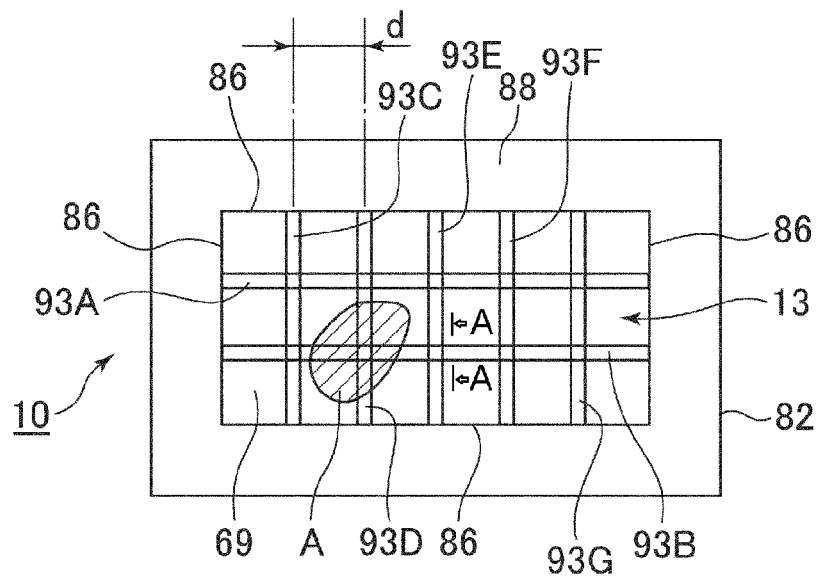
FIG. 19 is a plan view of the resin sandwich panel 10 according to the eighth embodiment of the present invention.

As illustrated in FIG. 18 and FIG. 19, the front-side skin material sheet 12A and the back-side skin material sheet 12B have the peripheral edge portions 82 thereof joined to each other, forming the internal hermetic space portion 84. Between the peripheral edge portions 82 and the outer peripheral edge portion 86 of the foamed core material 13 in the hermetic space portion 84, the annular space 88 is formed. When molten thermoplastic resin sheets as the material of the front-side skin material sheet 12A and the back-side skin material sheet 12B are molded, the peripheral walls of the sandwich panel 10 are formed of the peripheral edge portions 82. The annular space 88 is provided passively from the viewpoint of preventing molding failure due to the peripheral walls becoming attached to the foamed core material 13. In this way, when, as will be described later, the sandwich panel 10 are molded by welding the peripheral edge portions 82 of the skin material sheets 12A and 12B so as to sandwich the foamed core material 13 that has already been molded, a groove portion which is provided on the surface of the foamed core material 13, as will be described later, can extend to the outer peripheral edge portion 86 of the foamed core material 13 and communicate with the annular space 88. In this way, during mold clamping, an air accumulation which may be formed between the foamed core material 13 and the skin material sheets 12A and 12B can be dispersed to the annular space 88.

As illustrated in FIG. 19, in the surfaces 69 and 71 of the resin core material 13 respectively opposing the two resin skin material sheets 12, the lattice-shaped groove portions 93 are provided that are opened at the outer peripheral edge 91 of the resin core material 13. The groove portions 93 provided in the surfaces 69 and 71 of the resin core material 13 have the same structure. Accordingly, only the groove portions 93 provided on one surface 69 will be described.

The lattice-shaped groove portions 93 are constituted by a first groove portion group extending in parallel to the long sides of the resin core material 13, and a second groove portion group extending in parallel to the short sides of the resin core material 13. The groove portions of the first groove portion group and the second groove portion group are provided so as to be opened at the outer peripheral edge 86 of the resin core material 13. More specifically, seven groove portions 93 of groove portions 93A to 93G are provided. The groove portions 93A and 93B are provided in parallel to the long sides of the resin core material 13. The groove portions 93C to G are provided in parallel to the short sides of the resin core material 13. The groove portions are all provided so as to be opened at the outer peripheral edge 86 of the resin core material 13. In this case, it is difficult to predict how many air accumulations A of what size are formed where between the resin skin material sheet 12 and the resin core material 13. Accordingly, it is necessary to have the density of the lattice-shaped groove portions 93 increased so that the groove portions 93 can communicate with the unexpectedly formed air accumulation A. In this way, no matter where the air accumulation A may be formed, the accumulated air can be dispersed to the annular space 88. In FIG. 19, the closed region indicated by hatching of an arbitrary shape indicates the air accumulation A the location of which is indefinite. The interval (lattice width) of the adjacent groove portions 93 may be determined from such viewpoint.

Figure 20A:
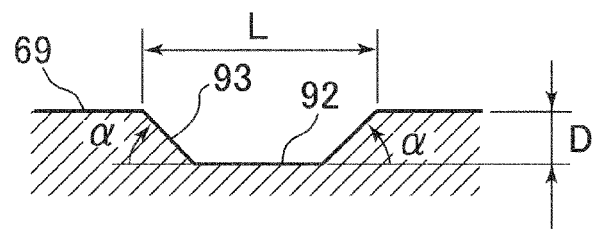
FIGS. 20(A) and 20(B) are a partial cross sectional view along line A-A of FIG. 19.
Figure 20B:
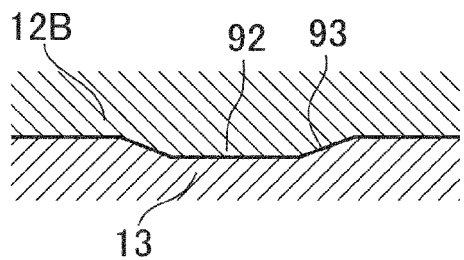

As illustrated in FIGS. 20(A) and 20 (B), the groove portions 93 have a flattened trapezoidal cross sectional shape. As illustrated in FIG. 20(A), the width L, depth D, and inclination angle α of the groove portions 93 may be determined from the viewpoint of dispersing the air accumulated in the air accumulation A via the groove portions 93 when the split mold blocks are clamped during the molding of the sandwich panel, as will be described later. As illustrated in FIG. 20(B), when the split mold blocks are clamped, the groove portions 93 are crushed and further flattened, as will be described later. As a result, the back-side skin material sheet 12B is joined to the bottom surface 92 of the groove portions 93, whereby a sufficient joint between the back-side skin material sheet 12B and the resin core material 13 is ensured. In particular, the depth D and the inclination angle α need to be determined from such viewpoint.

Figure 21:
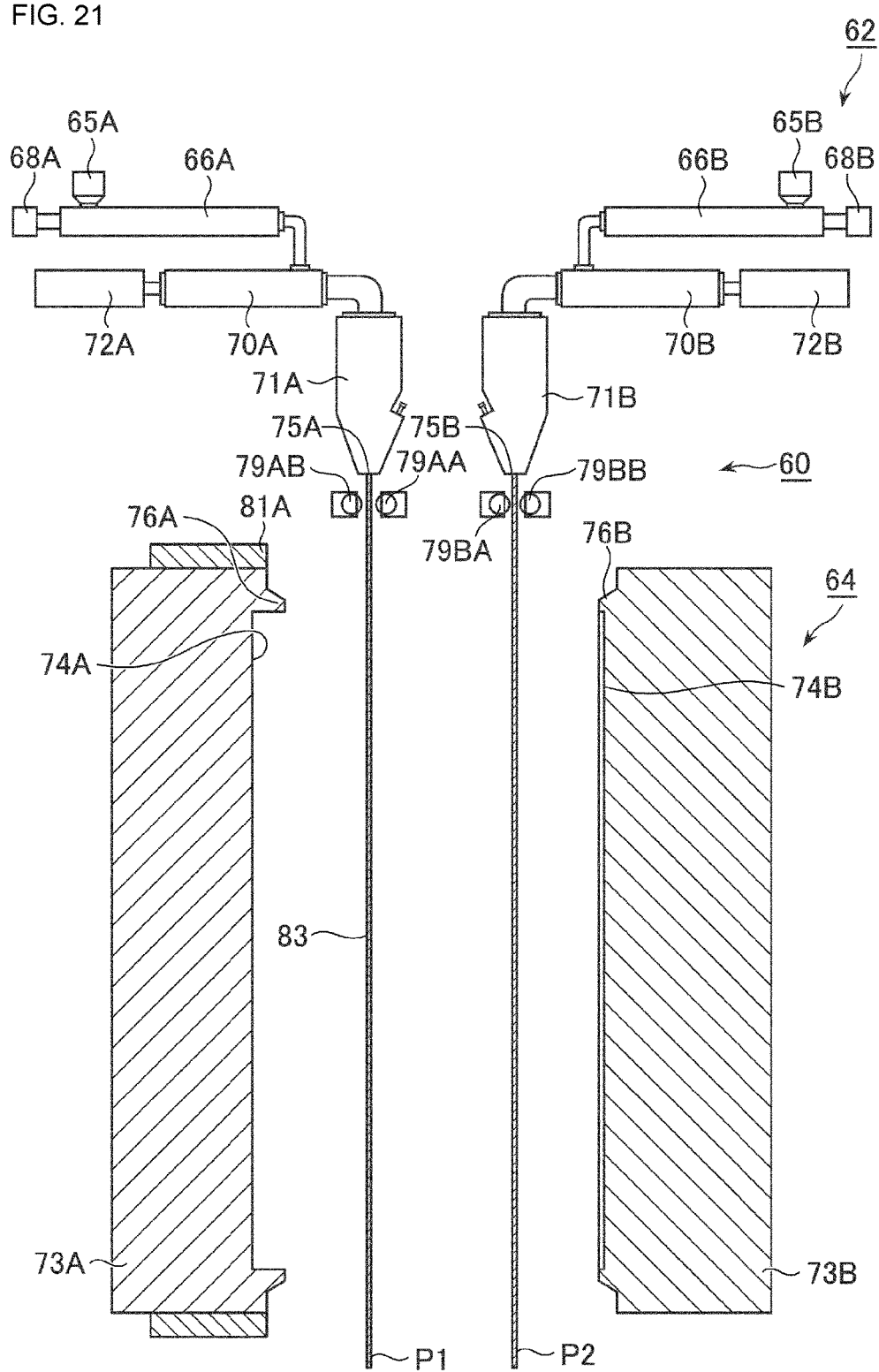
FIG. 21 is a diagram schematically illustrating a molding device for the resin sandwich panel 10 according to an embodiment of the present invention, while illustrating a state in which, in the molding step for the resin sandwich panel 10 according to the embodiment of the present invention, the thermoplastic resin sheets P1 and P2 are disposed between the split-type molds.

A device and method for molding the resin sandwich panel 10 having the above-described configuration using a mold will be described. As illustrated in FIG. 21, a molding device 60 for the resin sandwich panel 10 includes an extrusion device 62 and a clamping device 64 disposed under the extrusion device 62. Accordingly, a molten thermoplastic resin sheet P extruded from the extrusion device 62 is sent to the clamping device 64. The molten thermoplastic resin sheet P is then molded by the clamping device 64.

The extrusion devices 62 is of typical known type, and includes a cylinder 66 fitted with a hopper 65; a screw (not illustrated) provided in the cylinder 66; a hydraulic motor 68 linked to the screw; an accumulator 70 which internally communicates with the cylinder 66; and a plunger 72 provided in the accumulator 70. Resin pellets fed from the hopper 65 are melted and kneaded in the cylinder 66 as the screw is rotated by the hydraulic motor 68. Molten resin is transferred to an accumulator chamber. In the accumulator chamber, a certain quantity of molten resin is accumulated. The molten resin is sent toward a T die 71 by the driving of the plunger 72. Through a die slit (not illustrated), a thermoplastic resin sheet P is extruded in the form of a continuous sheet. The thermoplastic resin sheet P is then sent out downward while being pinch-pressed by a pair of rollers 79 disposed at an interval, and drooped between the split mold blocks 73. Accordingly, the sheet-like thermoplastic resin sheet P is disposed between the split mold blocks 73 in a tensioned state without wrinkles or slack. Detailed description of the extrusion devices 62 is omitted.

The extruding capacity of the extrusion device 62 is appropriately selected depending on the size of the molded front-side skin material sheets 12A and back-side skin material sheet 12B, and from the viewpoint of preventing a draw-down of the thermoplastic resin sheet P. More specifically, from a practical viewpoint, the rate of resin extrusion from the die slit may be several hundred kg/h or more and more preferably 700 kg/h or more. From the viewpoint of preventing a draw-down of the thermoplastic resin sheet P, the step of extruding the thermoplastic resin sheet P is preferably made as short as possible. While depending on the type of resin and the MFR value, the extrusion step is generally completed within 40 seconds and preferably within 30 seconds. Accordingly, the extruded amount of the thermoplastic resin from the die slit per unit area and unit time may be not less than 50 kg/hour and $cm^2$ and more preferably not less than 60 kg/hour and $cm^2$.

The die slit 75 is disposed vertically downward. Thus, the thermoplastic resin sheet P extruded from the die slit 75 is sent vertically downwardly as is while drooping from the die slit 75. By making the width of the die slit variable, the thickness of the continuous sheet-like thermoplastic resin sheet P can be modified.

Meanwhile, the clamping device 64 is also of typical known type as is the extrusion device 62, and includes two split-type molds 73 and a mold drive device. The mold drive device causes the molds 73 to move between open position and closed position in a direction substantially perpendicular to the supply direction of the molten sheet-like thermoplastic resin sheet P. Detailed description of the clamping device 64 is omitted.

The two split-type molds 73 are disposed with the cavities 74 opposing each other. The molds 73 are respectively disposed with the cavities 74 facing substantially the vertical direction. The surface of each of the cavities 74 is provided with an irregular portion in accordance with the outer shape and surface shape of the front-side skin material sheet 12A and the back-side skin material sheet 12B, which are molded based on the molten sheet-like thermoplastic resin sheet P.

In each of the two split-type molds 73, the pinch-off part 76 is formed around the cavities 74. The pinch-off part 76 is formed around the cavities 74 in an annular shape while protruding toward the opposing molds 73. Accordingly, when the two split-type molds 73 are clamped, the apex portions of the respective pinch-off parts 76 abut against each other. As a result, a parting line PL is formed at the peripheral edge of the molten thermoplastic resin sheet P.

On the outer periphery portion of the split mold block 73A, the frame 81A is slidably fitted. Accordingly, the frame 81A can be moved relative to the mold 73A by a frame moving device, which is not illustrated. More specifically, the frame 81A protrudes toward the mold 73B with respect to the mold 73A. Accordingly, the frame 81A can be abutted on one side surface 83 of the thermoplastic resin sheet P1 disposed between the molds 73.

Figure 22:
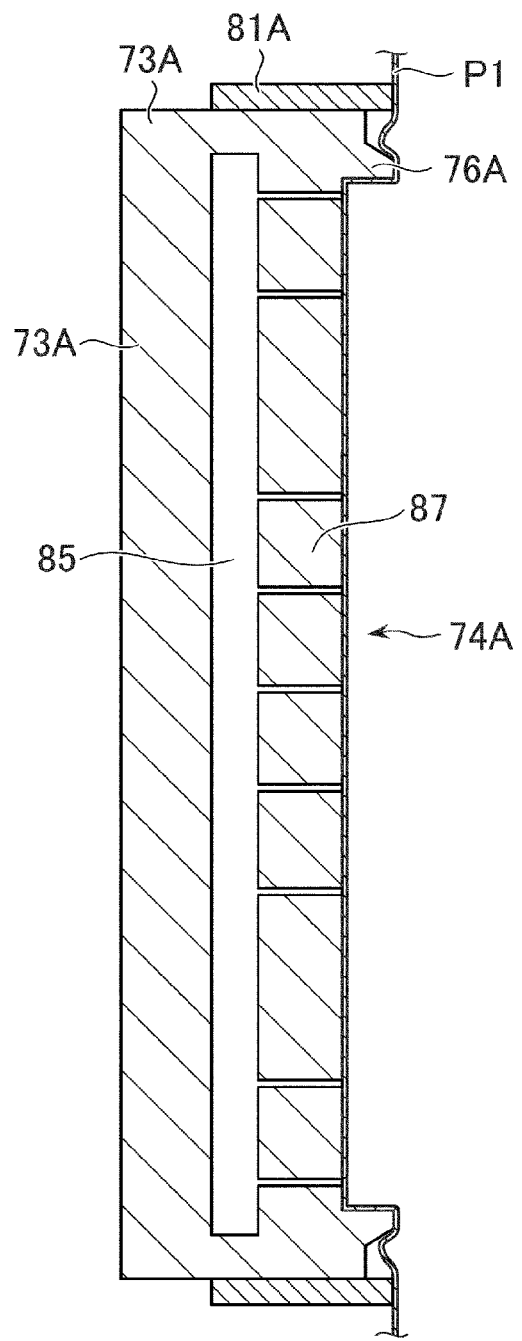
FIG. 22 is a schematic partial cross sectional view illustrating a situation in which, in the molding step for the resin sandwich panel 10 according to an embodiment of the present invention, the thermoplastic resin sheet P1 is being shaped.

As illustrated in FIG. 22, the split mold block 73A is internally provided with a vacuum suction chamber 85. The vacuum suction chamber 85 communicates with the cavity 74A via a suction hole 87. By performing suctioning from the vacuum suction chamber 85 via the suction hole 87, the thermoplastic resin sheet P1 is suction-attached toward the cavity 74A. In this way, a shape conforming to the shape of the outer surface of the cavity 74A is shaped.

The mold drive device may be similar to a typical device, of which description is omitted. The two split-type molds 73 are respectively driven by the mold drive device. Accordingly, in the open position, two molten continuous sheet-like thermoplastic resin sheets P1 and P2 can be disposed at an interval between the two split mold blocks 73. On the other hand, in the closed position, the pinch-off parts 76 of the two split mold blocks 73 are abutted on each other. In this way, as the annular pinch-off parts 76 are abutted on each other, a hermetic space is formed within the two split mold blocks 73. With regard to the movement of the molds 73 from the open position to the closed position, the closed position is the position on the center line of the two strips of molten continuous sheet-like thermoplastic resin sheets P1 and P2. In this way, the molds 73 are driven by the mold drive device to move toward the closed position.

A method for molding the resin sandwich panel 10 using the above-described molding device will be described. In advance, the foamed core material 13 is prepared, and the decorative material 14 is placed in the cavity 74B. The method for molding the foamed core material 13 may include a typical method by which foamed beads introduced into a mold are fused and fixed by heating. Alternatively, blow molding, vacuum molding, press molding, or, in some cases, injection molding, may also be used. The foamed core material 13 may be of solid type by a tubular parison or of hollow type by two strips of sheets. The foamed core material 13 may be placed at any time after mold opening and before clamping. Then, as illustrated in FIG. 21, the molten thermoplastic resin sheets P1 and P2 are extruded from the corresponding die slit 75 vertically downward. In this way, the two strips of continuous sheet-like thermoplastic resin sheets P1 and P2 are supplied between the two split mold blocks 73 so as to extend beyond the corresponding pinch-off parts 76.

Figure 23:
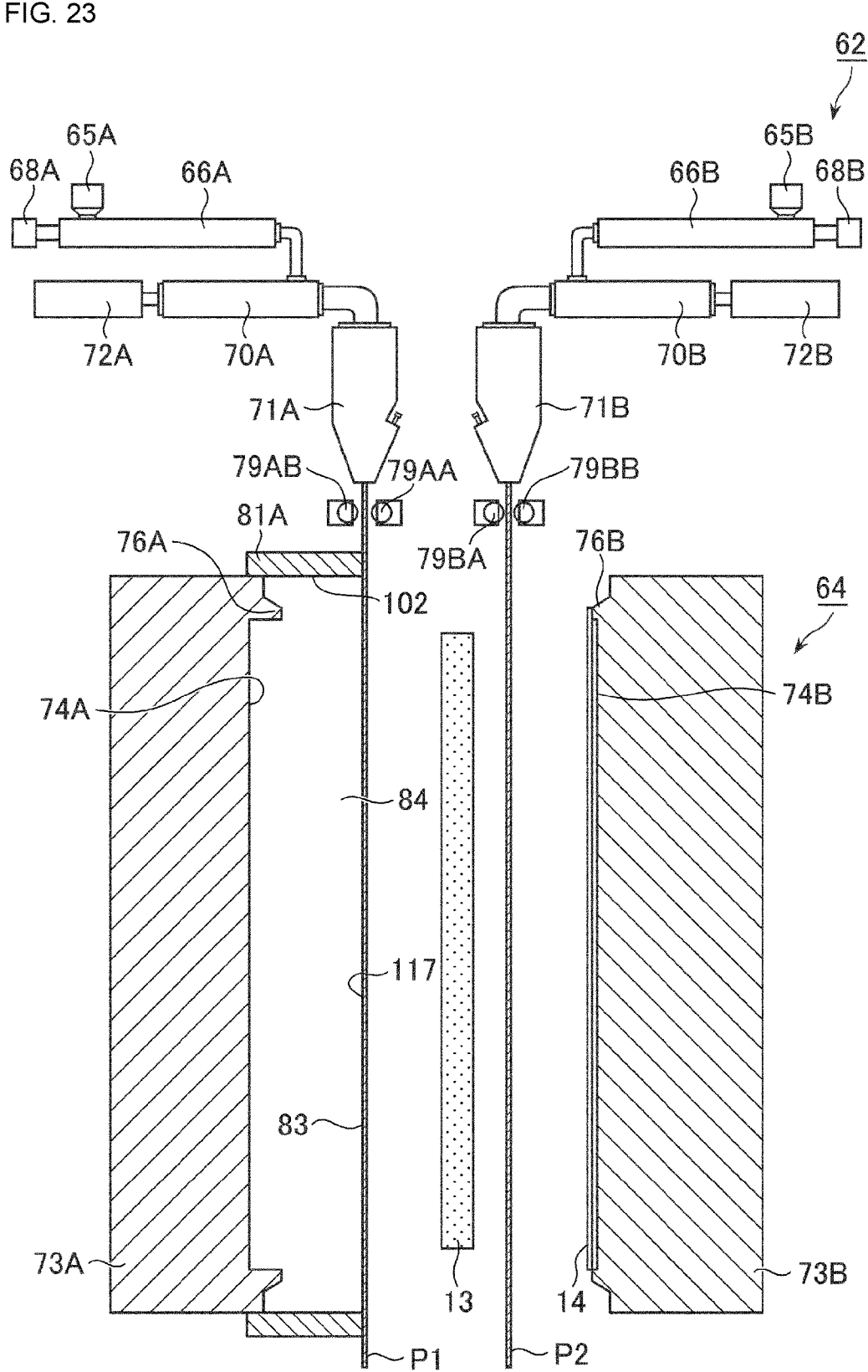
FIG. 23 is a schematic partial cross sectional view illustrating a situation in which, in the molding step for the resin sandwich panel 10 according to an embodiment of the present invention, the resin core material is placed between the thermoplastic resin sheets P1 and P2.

Then, as illustrated in FIG. 23, the frame 81A for the split mold block 73A is moved toward the thermoplastic resin sheet P1 relative to the split mold block 73A. The frame 81A then abuts on the side surface 83 of the thermoplastic resin sheet P1. Accordingly, a hermetic space 84 is formed by the side surface 83 of the thermoplastic resin sheet P1, the inner peripheral surface 102 of the frame 81A, and the cavity 73A.

Then, as illustrated in FIG. 22, the air in the hermetic space 84 is suctioned from the vacuum suction chamber 85 via the suction hole 87. Accordingly, the thermoplastic resin sheet P1 is suction-attached to the cavity 74A, whereby the thermoplastic resin sheet P1 is shaped in the shape in conformity to the surface of the cavity 74A.

Then, the foamed core material 13 is disposed between the two strips of thermoplastic resin sheets P1 and P2, in parallel to both sheets. The surface of the foamed core material 13 is then pressed onto the inner surface of the thermoplastic resin sheet P1, and welded and fixed. In this case, the air between the foamed core material 13 and the inner surface of the thermoplastic resin sheet P1 can be released via the lattice-shaped groove portions 93.

Figure 24:
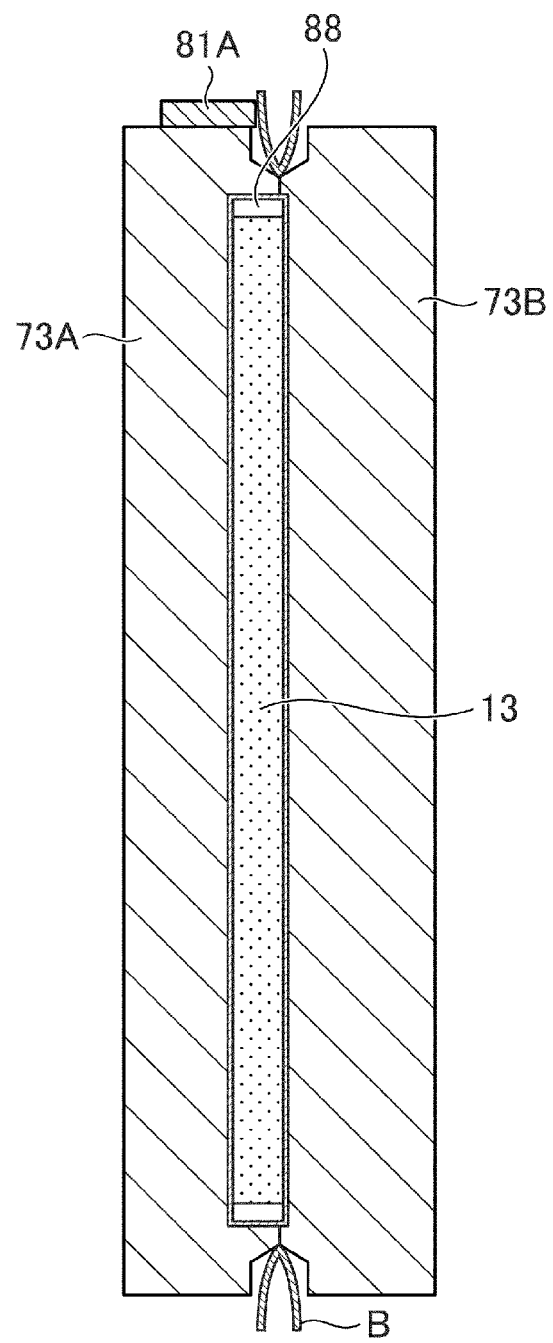
FIG. 24 is a diagram illustrating a state in which, in the molding step for the resin sandwich panel 10 according to an embodiment of the present invention, the split mold block 73 is clamped.

Then, as illustrated in FIG. 24, with the frame 81 abutting on the outer surface 83 of the thermoplastic resin sheet P1 being retained at the unchanged position, and with the thermoplastic resin sheet P1 being retained by suctioning, the molds 73A and B are moved toward each other until the respective annular pinch-off parts 76A and 76B abut on each other. Thereby, clamping is performed. More specifically, the pair of split mold blocks 73 are moved to the clamping position, and the inner surfaces of the two strips of thermoplastic resin sheets P1 and P2 are welded along the pinch-off parts of the pair of molds 73. Accordingly, the peripheral edge portions of the two strips of thermoplastic resin sheets P1 and P2 are integrated, whereby the internal pressure of the molds 73 increases. Accordingly, the air in the air accumulation A formed somewhere between the inner surface of the resin skin material sheet P2 and the surface 69 of the resin core material 13 can be dispersed to the annular space 88 via the lattice-shaped groove portions 93 and the peripheral edge portion 86 of the resin core material 13. Moreover, the resin core material 13 can be welded and integrated with the inner surfaces of the two strips of thermoplastic resin sheets P1 and P2. The decorative material 14 is also welded to the thermoplastic resin sheet P2. In this case, by crushing the groove portions 93 of the resin core material 13 (see FIG. 20(B)), the groove portions 93 are additionally flattened. The resin skin material sheet P2 is then joined to the bottom surface 92 of the groove portion 90. Thereby, a sufficient joint between the resin skin material sheet P2 and the resin core material 13 can be ensured. Such air-venting effect obtained during the clamping of the split mold blocks 73 is similarly obtained between the surface 71 of the resin core material 13 and the resin skin material sheet P1. The extruded thermoplastic resin sheet P may be formed in the sheet shape by crushing a molten tubular parison. During the extrusion of the molten tubular parison, the tubular parison may be cut at least at two locations along the extrusion direction, so as to form the tubular parison into two sheets.

Figure 25:
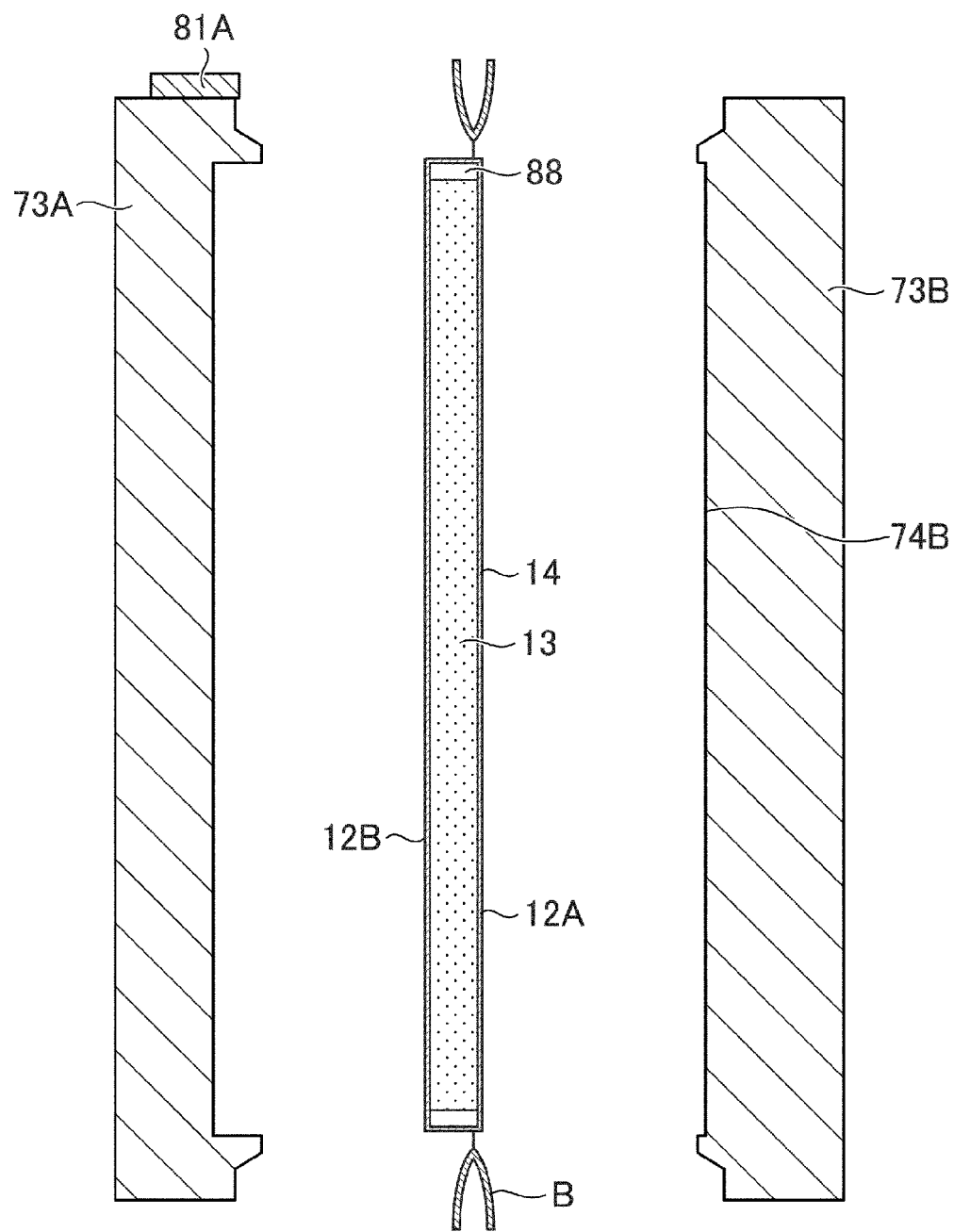
FIG. 25 is a diagram illustrating a state in which, in the molding step for the resin sandwich panel 10 according to an embodiment of the present invention, the split mold block 73 is opened.

Then, as illustrated in FIG. 25, the two split mold block 73 are opened, and the completed resin sandwich panel 10 is removed from the cavities 74. Burrs formed around the parting line PL are removed. Thus, the molding of the resin sandwich panel 10 is completed.

As described above, each time the molten thermoplastic resin is intermittently extruded, the above steps are repeated. Accordingly, one resin sandwich panel 10 after another can be efficiently molded. By the extrusion molding, the molten thermoplastic resin sheets P1 and P2 are extruded intermittently. The extruded thermoplastic resin sheets P1 and P2 can be shaped into a predetermined shape, using the molds 73.

In the resin sandwich panel 10 having the above-described configuration, the resin core material 13 is surface-to-surface adhered to each of the skin material sheets 12 while being sandwiched between the skin material sheets 12. In the resin core material 13, the annular space 88 per se constitutes an air accumulation. However, compared with an air accumulation formed on the resin core material 13, the weldability problem between the resin core material 13 and the skin material sheets 12 is eliminated. The problem of exterior appearance due to bulging is also small. On the other hand, the volume is large compared with the air accumulation on the resin core material 13. Accordingly, by actively utilizing the annular space 88 that has to be passively formed from the viewpoint of molding, the air accumulated over the resin core material 13 can be dispersed.

More specifically, as the peripheral edge portions of the two resin skin material sheets 12 are joined to each other, the annular space 88 is formed around the resin core material 13. At least one of the surfaces of the resin core material 13 opposing the two resin skin material sheets 12 is provided with a lattice-shaped groove portion 93 opened at an outer edge of the resin core material 13. Thereby, the lattice-shaped groove portion 93 communicates with the annular space 88. Accordingly, when the surface of the resin core material 13 on the lattice-shaped groove portion 93 side and the resin skin material sheet 12 opposing thereto are surface-to-surface adhered to each other, even if an unexpected air accumulation is formed therebetween, the air accumulated in the air accumulation can be dispersed to the annular space 88 via the lattice-shaped groove portion 93. The annular space 88 per se constitutes an air accumulation. However, compared with an air accumulation on the resin core material 13, the weldability problem and the problem of exterior appearance due to bulging are small. On the other hand, the volume is large compared with the air accumulation on the resin core material. Accordingly, the lattice-shaped groove portion provides an air-vent function. For example, when the resin sandwich panel 10 is molded, the risk of molding failure due to air accumulation A, or, even in the absence of molding failure, the risk of a lack of stiffness of the resin sandwich panel 10 as a whole due to insufficient welding of the resin core material 13 and the resin skin material sheet 12 is eliminated. In addition, the risk of the aesthetic exterior appearance of the resin sandwich panel 10 being compromised by a partial bulging of an air accumulation A region that has expanded is eliminated. Accordingly, the resin sandwich panel in which molding failure is not caused and of which required stiffness can be ensured can be provided while maintaining visual aesthetics.

In the following, a ninth embodiment of the present invention will be described with reference to FIG. 26 to FIG. 27. In the following description, constituent elements similar to those of the eighth embodiment will be designated with similar reference numerals, and their description is omitted. In the following, the characterizing portions of the present embodiment will be described in detail.

The present embodiment is characterized in that the atmosphere release hole 90 is provided in the resin skin material sheet 12, and in the corresponding form of the groove portions 93. More specifically, as illustrated in FIG. 26, the atmosphere release hole 90 provided in the resin skin material sheet 12 is a part of an adhered portion of the resin skin material sheet 12 with respect to the resin core material 13, i.e., a part of the resin skin material sheet 12 opposing the surface of the resin core material 13. Moreover, there is another atmosphere release hole 90 at a position corresponding to the annular space 88. In this way, two atmosphere release holes 90 are provided. Meanwhile, with regard to the form of the groove portions 93, in the eighth embodiment, the lattice-shaped groove portions 93 extend to the outer peripheral edge 86 of the resin core material 13 and are opened at the outer peripheral edge 86. On the other hand, in the present embodiment, as illustrated in FIG. 9, the groove portions 93 are provided in a lattice shape. In this respect, the present embodiment is similar to the eighth embodiment. However, in the ninth embodiment, the lattice-shaped groove portions 93 extend to the outer peripheral edge 86 of the resin core material 13 and are opened at the outer peripheral edge 86, while also extending to an inner peripheral edge 97 of the resin core material 13 and are opened at the inner peripheral edge 97. In this respect, the present embodiment is characterized.

Figure 27:
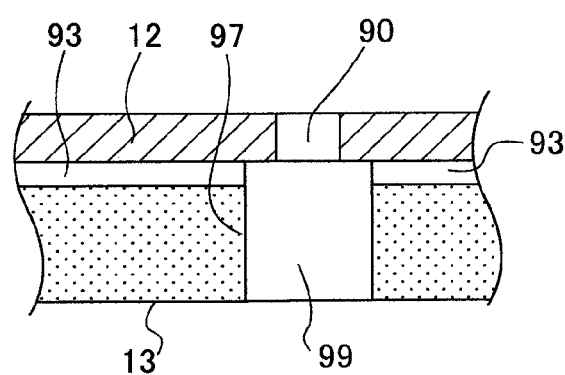
FIG. 27 is a partial cross sectional view along line B-B of FIG. 26.

More specifically, as illustrated in FIG. 27, at the position of the resin core material 13 corresponding to the atmosphere release hole 90, a through-hole 99 is provided so as to communicate with the atmosphere release hole 90, while penetrating throughout the thickness of the resin core material 13. The groove portions 93 extend to the inner peripheral edge 97 of the through-hole 99, and are opened at the inner peripheral edge 97. The shape and size of the through-hole 99 may be arbitrary as long as the through-hole 99 communicates with the atmosphere release hole 90. However, from the viewpoint of ensuring the stiffness of the sandwich panel, preferably the shape is cylindrical and the size is made as small as possible.

Figure 26:
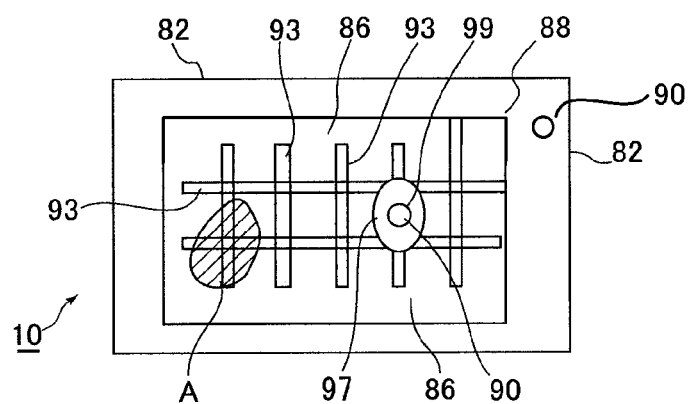
FIG. 26 is a plan view of the resin sandwich panel 10 according to the ninth embodiment of the present invention, similar to FIG. 19.

According to the above-described configuration, if, for example, the air accumulation A is formed at the position illustrated in FIG. 26, the air accumulation A communicates with any of the lattice-shaped groove portions 93. Accordingly, in the eighth embodiment, the accumulated air is dispersed to the annular space 88. However, in the present embodiment, during the molding of the sandwich panel, air vent can be performed from the air accumulation A via the groove portions 93, and through the atmosphere release hole 90. More specifically, during the clamping of the split mold blocks, the pressure of the hermetic space in the mold increases. The air accumulated in the air accumulation A is released via the groove portions 93B, 93C, or A to the through-hole 99. The air can be further released to the outer air from the atmosphere release hole 90 that communicates with the through-hole 99, or from the atmosphere release hole 90 provided at the position corresponding to the annular space 88. In this case, it is difficult to predict how many air accumulations A of what size will be formed where between the resin skin material sheet 12 and the resin core material 13. Accordingly, it is necessary to have the density of the lattice-shaped groove portions 93 on the surface 69 increased. In this way, the groove portions 93 communicate with the unexpectedly formed air accumulation A. Accordingly, the accumulated air can be released via the atmosphere release hole 90 no matter where the air accumulation A may be formed. In these respects, the present embodiment is similar to the eighth embodiment. The method for molding the sandwich panel according to the present embodiment is similar to the one for the eighth embodiment.

Figure 28:
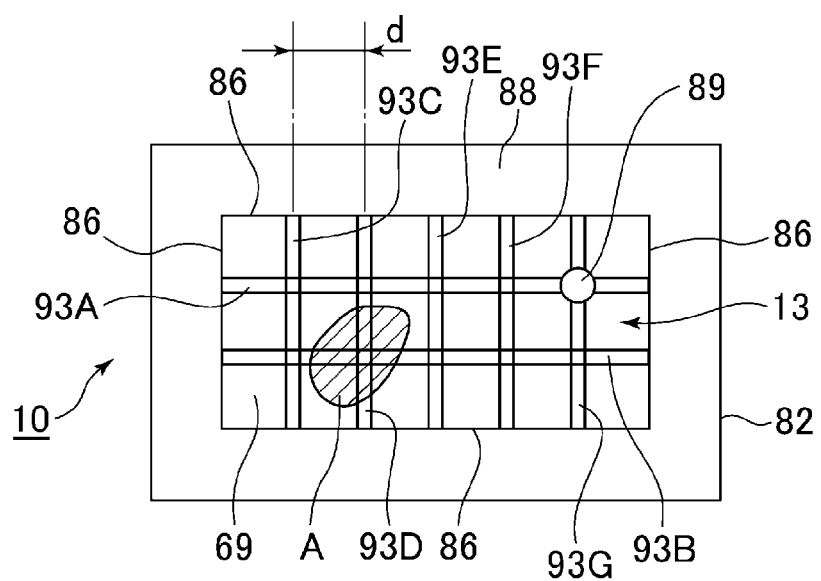
FIG. 28 is a plan view of the resin sandwich panel 10 according to the tenth embodiment of the present invention, similar to FIG. 19.

In the following, a tenth embodiment of the present invention will be described with reference to FIG. 28. In the following description, constituent elements similar to those of the eighth embodiment will be designated with similar reference numerals, and their description is omitted. In the following, the characterizing portions of the present embodiment will be described.

The present embodiment is characterized in that the depression 89 is further provided at an intersection of the groove portions 93. The depression 89 is provided at the intersection of the groove portions 93 as in the first embodiment. The depression 89 is disposed so as to communicate with the vertical and horizontal groove portions 93. The depression 89 forms a cylindrical through-hole, as in the first embodiment. The through-hole includes openings formed in the respective surfaces of the resin core material 13, and extends inwardly so as to penetrate in the thickness direction. The inside of the depression 89 constitutes a void closed by the corresponding resin skin material sheets 12. Accordingly, whether the air accumulation A is formed in one or the other surface of the resin core material 13, the air accumulated in the air accumulation A can be dispersed to the annular space 88 via the lattice-shaped groove portions 93. Moreover, the air can be collected to the depression 89 via the groove portions 93.

While the embodiments of the present invention have been described in detail, various corrections or variations may be made to the present invention by those skilled in the art without departing from the scope thereof. For example, the fifth embodiment has been described with reference to the case where, based on the first embodiment, the lattice-shaped groove portions 93 are provided as a single curved long groove, or as a plurality of annular grooves that are nestled. However, the embodiments of the present invention are not limited to such configuration. In any of the second to the fourth embodiments, the lattice-shaped groove portions 93 may be provided as a single curved long groove or as a plurality of annular grooves that are nestled. For example, the third embodiment has been described with reference to the case where all of the lattice-shaped groove portions 93 extend to the outer peripheral edge of the core material 13. However, the embodiments of the present invention are not limited thereto. As long as the annular space 88 communicates with the air accumulation A via the groove portions 93, some may extend to the outer peripheral edge of the core material 13. For example, in the present embodiment, the molten thermoplastic resin sheets P1 and P2 extruded from the extrusion slit are directly molded. However, the embodiments of the present invention are not limited thereto. One and/or the other of the thermoplastic resin sheets P1 and P2 may be preliminarily molded in advance, and later made into molten state by re-heating. For example, the eighth embodiment has been described with reference to the case where the lattice-shaped groove portion is provided. However, the embodiments of the present invention are not limited thereto. As long as the air accumulated in the air accumulation A can be released to the outer air, the groove portion may be provided in the shape of a cross. For example, in the eighth embodiment, the molten thermoplastic resin sheets P1 and P2 extruded from the extrusion slit are directly molded. However, the configuration is not a limitation, and one and/or the other of the thermoplastic resin sheets P1 and P2 may be preliminarily molded in advance, and later made into molten state by re-heating.

The invention claimed is:

1. A resin sandwich panel comprising:
   two resin skin material sheets; and
   a resin core material sandwiched between the skin material sheets and surface-to-surface adhered to each of the skin material sheets, wherein
   the two resin skin material sheets have peripheral edge portions thereof joined to each other so as to form an internal hollow portion,
   the resin core material is disposed in the hollow portion,
   at least one of surfaces of the resin core material opposing the two resin skin material sheets has a groove portion extending across the entire surface, and a depression communicating with the groove portion, and
   at least one of the two resin skin material sheets additionally has an atmosphere-opened through-hole provided in a thickness direction thereof so that when the at least one of the surfaces of the resin core material and the corresponding resin skin material sheet are surface-to-surface adhered to each other in the hollow portion, air between the at least one of the surfaces and the corresponding resin skin material sheet is guided to the depression via the groove portion, and exhausted out of the atmosphere-opened through-hole.

2. The resin sandwich panel according to claim 1, wherein
   the depression includes an opening formed in the at least one of the surfaces, the depression extending inwardly and further including an internal void closed by the corresponding resin skin material sheet,
   the opening has an area set to ensure sufficient surface adhesion between the at least one of the surfaces and the corresponding resin skin material sheet, and
   the void has a volume set to be sufficient that, when the at least one of the surfaces of the resin core material and the corresponding resin skin material sheet are surfaceto-surface adhered to each other in the hollow portion, an increase in an internal pressure of the void can be suppressed with the air guided to the depression via the groove portion.

3. The resin sandwich panel according to claim 2, wherein the groove portion includes a plurality of nestled annular grooves, at least adjacent grooves of which communicating with each other.

4. The resin sandwich panel according to claim 2, wherein the groove portion is lattice-shaped and is constituted by a first groove portion group extending in parallel to a long side of the resin core material and a second groove portion group extending in parallel to a short side of the resin core material.

5. The resin sandwich panel according to claim 1, wherein
the resin core material is a foamed resin having a predetermined foam expansion ratio, and
the resin skin material sheet opposing the at least one of the surfaces of the resin core material is joined to a bottom surface of the groove portion.

6. The resin sandwich panel according to claim 1, wherein
the groove portion is disposed on each of the surfaces of the resin core material, and
the depression is disposed penetrating through the resin core material in a thickness direction thereof.

7. The resin sandwich panel according to claim 1, wherein
the atmosphere-opened through-hole is formed by piercing a piercing needle through at least one of the two resin skin material sheets, and
the depression is provided on the at least one of the surfaces of the resin core material at a location corresponding to the atmosphere-opened through-hole so as to be sufficient to avoid interference with the piercing needle.

8. The resin sandwich panel according to claim 1, wherein
the two resin skin material sheets have peripheral edge portions thereof joined to each other so as to form an outer peripheral space portion around the resin core material,
the groove portion is provided so as to be opened at an outer edge of the resin core material, the groove portion thereby communicating with the outer peripheral space portion, and
the atmosphere-opened through-hole is formed by piercing a piercing needle through at least one of the two resin skin material sheets at a position corresponding to the outer peripheral space portion.

9. The resin sandwich panel according to claim 1, wherein
the atmosphere-opened through-hole is formed by piercing a piercing needle through at least one of the two resin skin material sheets, and
the at least one of the surfaces of the resin core material has a recess having a space sufficient to avoid interference with the piercing needle, the recess being provided at a location corresponding to the atmosphere-opened through-hole so as to communicate with the depression via the groove portion.

10. The resin sandwich panel according to claim 1, wherein
the two resin skin material sheets have peripheral edge portions thereof joined to each other so as to form an outer peripheral space portion around the resin core material, and
the groove portion is formed in the shape of a lattice opened at an outer edge of the resin core material, the lattice-shaped groove portion thereby communicating with the outer peripheral space portion.

11. A sandwich panel comprising:
two resin skin material sheets; and
a resin core material sandwiched between the skin material sheets and surface-to-surface adhered to each of the skin material sheets, wherein
the two resin skin material sheets have peripheral edge portions thereof joined to each other so as to form an internal hollow portion that serves as an outer peripheral space portion around the resin core material, and
at least one of surfaces of the resin core material opposing the two resin skin material sheets has a lattice-shaped groove portion opened at an outer edge of the resin core material, the lattice-shaped groove portion thereby communicating with the internal hollow portion and including an atmosphere-opened through-hole communicating with the internal hollow portion.

12. The resin sandwich panel according to claim 11, wherein the internal hollow portion constitutes a hermetic annular space portion.

13. The resin sandwich panel according to claim 11, wherein
the resin core material is a foamed resin having a predetermined foam expansion ratio, and
at least one of the two resin skin material sheets is joined to a bottom surface of the groove portion.

14. The resin sandwich panel according to claim 11, wherein the lattice-shaped groove portion is disposed on a surface of the resin core material opposing each of the two resin skin material sheets.

15. The resin sandwich panel according to claim 11, wherein
at least one of surfaces of the resin core material opposing the two resin skin material sheets has a depression communicating with the groove portion,
the depression includes an opening formed in the at least one of the surfaces, the depression extending inwardly and further constituting an internal void closed by the corresponding resin skin material sheet,
the opening has an area set to ensure sufficient surface adhesion between the at least one of the surfaces and the corresponding resin skin material sheet,
the void has a volume set to be sufficient that, when the at least one of the surfaces of the resin core material and the corresponding resin skin material sheet are surface-to-surface adhered to each other in the hollow portion, an increase in an internal pressure of the void can be suppressed by air guided to the depression via the groove portion so that when the at least one of the surfaces of the resin core material and the corresponding resin skin material sheet are surface-to-surface adhered to each other, air between the at least one of the surfaces and the corresponding resin skin material sheet is guided to the depression via the groove portion.

* * * * *